FLUID AMPLIFIER EMPLOYING BOUNDARY LAYER EFFECT

Filed Oct. 19, 1960 7 Sheets-Sheet 1

INVENTORS
ROMALD E. BOWLES
RAYMOND W. WARREN
BY S. J. Rotondi, A. J. Dupont, F. E. McGee & J. M. Presson

FLUID AMPLIFIER EMPLOYING BOUNDARY LAYER EFFECT

INVENTORS
ROMALD E. BOWLES
RAYMOND W. WARREN

BY S. J. Rotondi, A. J. Dupont, F. E. McGee + J. M. Presson

FLUID AMPLIFIER EMPLOYING BOUNDARY LAYER EFFECT

Filed Oct. 19, 1960 7 Sheets-Sheet 3

INVENTORS
ROMALD E. BOWLES
RAYMOND W. WARREN

BY S. J. Rotondi, A. J. Dupont, F. E. McGee & J. M. Presson

INVENTORS
ROMALD E. BOWLES
RAYMOND W. WARREN
BY S. J. Rotondi, A. J. Dupont, F. E. McGee & J. M. Presson

FLUID AMPLIFIER EMPLOYING BOUNDARY LAYER EFFECT

Filed Oct. 19, 1960 7 Sheets-Sheet 5

INVENTORS
ROMALD E. BOWLES
RAYMOND W. WARREN
BY S. J. Rotondi, A. J. Dupont, F. E. McGee & J. M. Presson

INVENTORS,
ROMALD E. BOWLES
RAYMOND W. WARREN
BY

S. J. Rotondi, A. J. Dupont, F. E. McGee & J. M. Presson

INVENTORS
ROMALD E. BOWLES
RAYMOND W. WARREN
BY S. J. Rotondi, A. J. Dupont, L. E. McGee & J. M. Presson United States Patent Office 3,396,619
Patented Aug. 13, 1968

3,396,619
FLUID AMPLIFIER EMPLOYING BOUNDARY LAYER EFFECT

Romald E. Bowles, 12712 Meadowood Drive, Silver Spring, Md. 20904, and Raymond W. Warren, 7925 Falstaff Road, McLean, Va. 22101

Continuation-in-part of applications Ser. No. 855,478, Nov. 25, 1959, and Ser. No. 4,830, Jan. 26, 1960. This application Oct. 19, 1960, Ser. No. 58,188
166 Claims. (Cl. 83—639)

The invention described herein may be manufactured and used by or for the Government for governmental purposes without the payment to us of any royalty thereon.

This application is a continuation-in-part of our prior applications for U.S. patent, Ser. No. 855,478, filed Nov. 25, 1959, and entitled "Multi-Stable Fluid Operated System," now abandoned, and Ser. No. 4,830, filed Jan. 26, 1960, and entitled "Fluid Multi-Stable Memory Unit," now abandoned.

This invention relates to a multistable fluid-operated system which utilizes the flow of a fluid so that the system performs functions which are analogous to some functions now being performed by electronic components and systems.

Electronic systems and components are capable of performing such functions as detecting and amplifying a signal. However, it is also desirable that systems other than electronic perform the same or analogous functions without requiring a source of electrical energy or delicate electronic components. While known mechanical systems will perform functions somewhat analogous to fuctions performed by electronic systems, the former systems require a large number of moving parts. Failure in any part usually results in improper operation of the system.

The present invention relates generally to fluid amplifier systems having no moving solid parts in which amplification is a function of the magnitude of deflection of a main fluid jet by a transverse fluid pressure distribution. More particularly it relates to a fluid amplifier utilizing the effects of interaction between the fluid streams and the side walls of the interaction region to control the pressure distribution within the main fluid jet so as to govern the main fluid jet flow path; and to control local pressure distribution of the interaction region fluids which are not within the main fluid jet so as to govern the main fluid jet flow path. The side walls serve a further function as a resisting solid boundary to restrict motion and flow of fluid particles within the interaction region. In consequence of the interaction between the interaction region side walls and the fluid in the main stream and the ambient fluid, the fluid amplifiers of the present invention are capable of performing amplification and switching functions somewhat analogous to those now conventionally performed only by electronic circuits or to a more limited extent by fluid systems which have moving solid parts.

Broadly, therefore, it is an object of this invention to provide a multistable fluid-operated system which performs some functions which are analogous to functions performed by existing electronic systems.

More specifically, it is an object of this invention to utilize the flow of a stream of fluid under pressure so that the fluid acts in a manner somewhat similar to the manner in which electrons act in electronic systems.

It is an object of this invention to provide a fluid system capable of producing results similar to those achieved by control of electrons in electronic systems.

It is another object of this invention to utilize the principle of "boundary layer control" to effect a continuously variable amplitude of switching action of a fluid power stream from one aperture to another.

Still another object is to utilize the principle of "boundary layer control" to effect a definite multiple switching action of the fluid stream from one aperture to another.

Still another object of this invention is to provide a fluid-operated system which acts as a memory.

It is a further object of this invention to provide a multistable fluid-operated system, in accordance with the above objects, which requires no moving parts other than the fluid.

In fluid amplifier systems of the type with which the present invention is concerned, a power jet of fluid, which is well defined in space, is deflected by means of a pressure differential established approximately transverse to the normal direction of movement of the power jet. The differential in pressure established across the power jet may be employed to deflect the jet to one of various positions at which load devices may be situated. These may convert a portion of the energy of the fluid stream to useful work. Alternatively, the energy, pressure or mass flow of the deflected stream may be employed as an input signal to a further fluid amplifier or a fluid amplifier system to increase the overall amplification of the system or to perform switching functions. Amplification is achieved by the fluid amplifier as a result of the fact that a relatively small control fluid flow is required to deflect a high energy fluid stream so as to produce a relatively large variation in energy, pressure or mass flow, delivered to an output location.

A typical single stage amplifier, chosen for purposes of ease of explanation only, may comprise a main fluid nozzle extending through an end wall of an interaction region defined by a sandwich type structure consisting of an upper plate and a lower plate (which serve to restrict fluid flow to an approximately two-dimensional flow pattern between the two plates), an end wall, two sidewalls (hereinafter referred to as the left and right sidewalls), and one or more dividers disposed at a predetermined distance from the end wall. The leading edges or surfaces of the dividers are disposed relative to the main fluid nozzle centerline so as to define separate areas in a target plane. The sidewalls of the dividers in conjunction with the interaction region sidewalls establish the receiving apertures which are entrances to the amplifier output channels. Completing the description of the apparatus, left and right control orifices may extend through the left and right sidewalls respectively. In the complete unit, the region bounded by top and bottom plates, sidewalls, the end wall, receiving apertures, dividers, control orifices and a main fluid nozzle, is termed an "interaction region or interaction chamber region." The unit described above is capable of operation as one of several subtypes of fluid amplifier units depending upon the specific arrangement of the unit.

Two broad classes of pure fluid amplifiers are: (I) Stream interaction or momentum exchange and (II) Boundary layer control.

In order to understand operation of this first broad class of fluid amplifiers, Class I, attention is called to the copending patent applications of B. M. Horton, Ser. Nos. 848,878, now abandoned and 51,896, now Patent No. 3,122,165, filed Oct. 26, 1959 and Sept. 19, 1960, respectively, portions of the discussions of which are reproduced herewith for the purposes of clarity of the present discussion only. Class I amplifiers include devices, in distinction to the devices of Class II, in which there are two or more streams which interact in such a way that one or more of these streams (control streams) deflects another stream (power stream) with little or no interaction between the side walls of the interaction region and the streams themselves. Power stream deflection in such a unit is continously variable in accordance with control signal amplitude. Such a unit is referred to as a continuously variable amplifier or computer element. In an amplifier or computer element of this type, the detailed contours of the side walls of the interaction chamber are of secondary importance to the interacting forces between the streams themselves. Although the side walls of such units can be used to contain fluid in the interacting chamber, and thus make it possible to have the streams interact in a region at some desired ambient pressure, the side walls are so placed that they are somewhat remote from the high velocity portions of the interaction streams and the power stream does not approach or attach to the side walls. Under these conditions the power stream flow pattern within the interacting chamber depends primarily upon the size, speed and direction of the power stream and control streams and upon the density, viscosity, compressibility and other properties of the fluids in these streams.

(II) The present invention relates to the second broad class of fluid amplifier and computer elements; i.e., boundary layer control units. This second broad class of fluid amplifier and computer elements comprises units in which the main power stream flow and the surrounding fluid interact in such a way with the interaction region side walls that the resulting flow patterns and pressure distributions within the interaction region are greatly affected by the details of the design of the chamber walls. In this broad class of units, the power stream may approach or may contact the interaction region side walls. The effect of the side wall configuration on the flow patterns and pressure distribution, which can be achieved with single or multiple streams, depends upon the relation between: the width of the interacting chamber near the power nozzle, the width of the power nozzle, the position of the center line of the power nozzle relative to the side walls (symmetrical or asymmetrical), the angles that the side walls make with respect to the center line of the power nozzle; the length of the side walls or their effective length as established by the spacing between the power nozzle exit and the flow dividers, side wall contour and slope distribution; and the density, viscosity, compressibility and uniformity of the fluids used in the interaction region. It also depends on the aspect ratio and therefore to some extent on the thickness of the amplifying or computing element in the case of two-dimensional units. The interrelationship between the above parameters is quite complex and is described subsequently. Response time characteristics are a function of size of the units in the case of similar units.

Amplifying and computing devices of this second broad category which utilize boundary layer effects; i.e., effects which depend upon details of side wall configuration and placement, can be further subdivided into three sub-types:

(*a*) Boundary layer units in which there is no "lock on" effect.
(*b*) Boundary layer units in which "lock on" effects are appreciable.
(*c*) Boundary layer units in which "lock on" effects are dominate and which have memory.

(*a*) Boundary layer elements in which there is no "lock on" effect. Such a unit has a gain as a result of boundary layer effects. However, these effects do not dominate the control signal but instead combine with the control flows to provide a continuously variable output signal responsive to control signal amplitude. In these units the power stream remains diverted from its initial direction only if there is a continuing flow out of or into one or more of the control orifices.

(*b*) Boundary layer units in which "lock on" effects are appreciable. In these units, the boundary layer effects are sufficient to maintain the power stream in a particular deflected flow pattern through the action of the pressure distribution arising from asymmetrical boundary layer effects and require no additional streams, other than the power stream to maintain that flow pattern. Naturally in this type unit continuous application of a control signal can also be used to maintain a power stream flow pattern. Such flow patterns can be changed to a new stable flow pattern, however, either by supplying or removing fluid through one or more of the control orifices, or through a control signal introduced by altering the pressures at one or more of the output apertures, as for example by blocking of the output channel to which flow has been directed.

(*c*) Boundary layer control units which have "memory," i.e., wherein lock-on characteristics dominate control signals resulting from complete blockage of the outlet to which flow has been commanded.

In "memory" type boundary layer units, the flow pattern can be maintained through the action of the power stream alone without the use of any other stream or continuous application of a control signal. In these units, the flow pattern can be modified by supplying or removing fluid through one or more of the appropriate control orifices. However, certain parts of the power stream flow pattern, including "lock-on" to a given side wall, are maintained even though the pressure distribution in the output channel to which flow is being delivered is modified, even to the extent of completely blocking this output channel.

The power stream deflection phenomena in boundary layer units is the result of a transverse pressure gradient due to a difference in the effective pressures which exist between the power stream and the opposite interaction region side walls; hence, the term Boundary Layer Control. In order to explain this effect, assume initially that the fluid stream is issuing from the main nozzle and is directed toward the apex of a centrally located divider. The fluid issuing from the nozzle, in passing through the chamber, entrains some of the surrounding fluid in the adjacent interaction regions and removes this fluid therefrom. If the fluid stream is slightly closer to, for instance, the left side wall than the right side wall, it is more effective in removing the fluid in the interaction region between the stream and the left wall than it is in removing fluid between the stream and the right wall since the former region is smaller. Therefore, the pressure in the left interaction region between the left side wall and power stream is lower than the pressure in the right interaction region and a differential pressure is set up across the power jet tending to deflect it towards the left side wall. As the stream is deflected further toward the left side wall, it becomes even more efficient in entraining fluid from the left interaction region and the effective pressure in this region is further reduced. In those units which exhibit "lock-on" features or characteristics, this feedback-type action is self-reinforcing and results in the fluid power stream being deflected toward the left wall and predominantly entering the left receiving aperture and outlet channel. The stream attaches to and is then directly deflected by the left side wall as the power stream effectively intersects the left side wall at a predetermined distance downstream from the outlet of the main orifice; this location being normally referred to as the "attachment location. This phenomena is referred to as boundary layer lock-on. The operation of this type of apparatus may be completely symmetrical in that if the stream had initially been slightly deflected toward the right side wall rather than the left side wall, boundary layer lock-on would have occurred against the right side wall.

Control of these units can be effected by controlled flow of fluid into the boundary layer region from control orifices at such a rate that the pressure in the associated boundary layer region becomes greater than the pressure in the opposing boundary layer region located on the opposite side of the power stream and the stream is switched towards this opposite side of the unit.

Alternatively instead of having flow into the boundary layer region to control the unit, fluid may be withdrawn from this "opposite" control orifice to effect a similar control by lowering the pressure on this "opposite" side of the stream instead of raising the pressure on the first side. The control flow may be at such a rate and volume as to deflect the power stream partially by momentum interchange so that a combination of the two effects may be employed. However, it is not essential, and in many cases is undesirable, that the control flow have a momentum component transverse to the power stream when the control fluid issues from its control orifice.

Only a small amount of energy is required in the control signal fluid flow to alter the power jet path so that some or all of the power jet becomes intercepted by the load device or output channel. For a continuously applied control signal, the power gain of this system can be considered equal to the ratio of the "change of power delivered by the amplifier to its output channel or load" to the "change of control signal power" required to effect this associated "change of power" delivered to the output channel or load. Similarly, the pressure gain can be considered equal to ratio of the "change of output pressure" to the "change of control signal pressure" required to cause the change, or, the ratio of the "change of output channel mass flow rate" to the associate "change of control signal mass flow rate" required defines the mass flow rate gain.

Power, pressure, and mass flow gains of the order of magnitude of 50 are obtainable with an amplifier stage of the type described above. A particular unit does not normally provide gains of this magnitude for all three parameters and the unit is usually designed to optimize the gain of the apparatus for a specific parameter.

Thus it is clear that the boundary layer effects provide a feedback action in a fluid amplifying element and thus have an important bearing on its gain, sensitivity to input control signals, sensitivity to control signals introduced by back loading (which effects pressure at the receiving apertures or output channels), response time, frequency response, and memory. This feedback action can be used to provide digital operation, logic type operations, memory, and in addition continuously variable output signals. Each of these types of operation is responsive to fluid control signals which change the relationship between net flow of fluids to and from the interaction regions adjacent the main power stream.

In the above discussion a two dimensional configuration has been described for purposes of clarity. However, the invention and description relative thereto are also inclusive of configurations which are three-dimensional in nature, as for example, axially symmetric units which result from rotation of a plan view about an axis coincident with the power nozzle centerline, rotation of the right or left half of a plan view about an axis parallel to but displaced from the aforementioned centerline, or rotation of a plan view about an axis normal to but in the plane of the plan view so as to provide a toroidal geometry.

In addition, while the particular examples described symmetrical units, it is apparent that asymmetric units of the types described and of combinations of the types described form a part of this invention. For example, a two dimensional unit may comprise a right half which is of type (*c*) and a left half in which the left side wall length is less than the distance between power nozzle exit and divider leading edge. For such a unit the left half of the unit functions as a type (*b*) boundary layer control unit while the right half functions as a type (*c*) boundary layer control unit.

It is apparent that this second broad class of pure fluid amplifiers and components and systems provide units which can be interconnected with other units (for example either of classes I or II) wherein the output signal of one unit can provide the power jet supply of a second unit, hereinafter referred to as a series staging connection, and alternatively wherein another unit can be used so that its output channels provide the control fluid signal flow of either the first unit above, or the second unit above, hereinafter referred to as a parallel staging connection. Alternately the output signal of a class II unit can be fed back to its own control system as an additional control signal through external feedback circuits in a fashion similar to that described in the patent applications of B. M. Horton Ser. Nos. 30,691, now U.S. Patent No. 3,024,805, issued Mar. 13, 1962 and 51,754, filed respectively on May 20, 1960, and August 14, 1960, and the patent application of B. M. Horton and R. E. Bowles Ser. No. 21,062 filed on Apr. 8, 1960, now U.S. Patent No. 3,185,166, issued May 25, 1965. It should be noted that pure fluid amplifiers do not require amplifiers employing pure fluids. The term "pure fluid amplifier" refers rather to those amplifiers in which amplification is achieved purely through use of fluid without the necessity of moving solid parts. The fluid employed may be pure, or a mixture of fluids, or contaminated fluids, or fluids with entrained or suspended solids; wherein "fluid" refers to either or both compressible or incompressible fluids.

The specific nature of the invention, as well as other objects, uses and advantages thereof, will clearly appear from the following description and from the accompanying drawings, in which.

Figure 1:
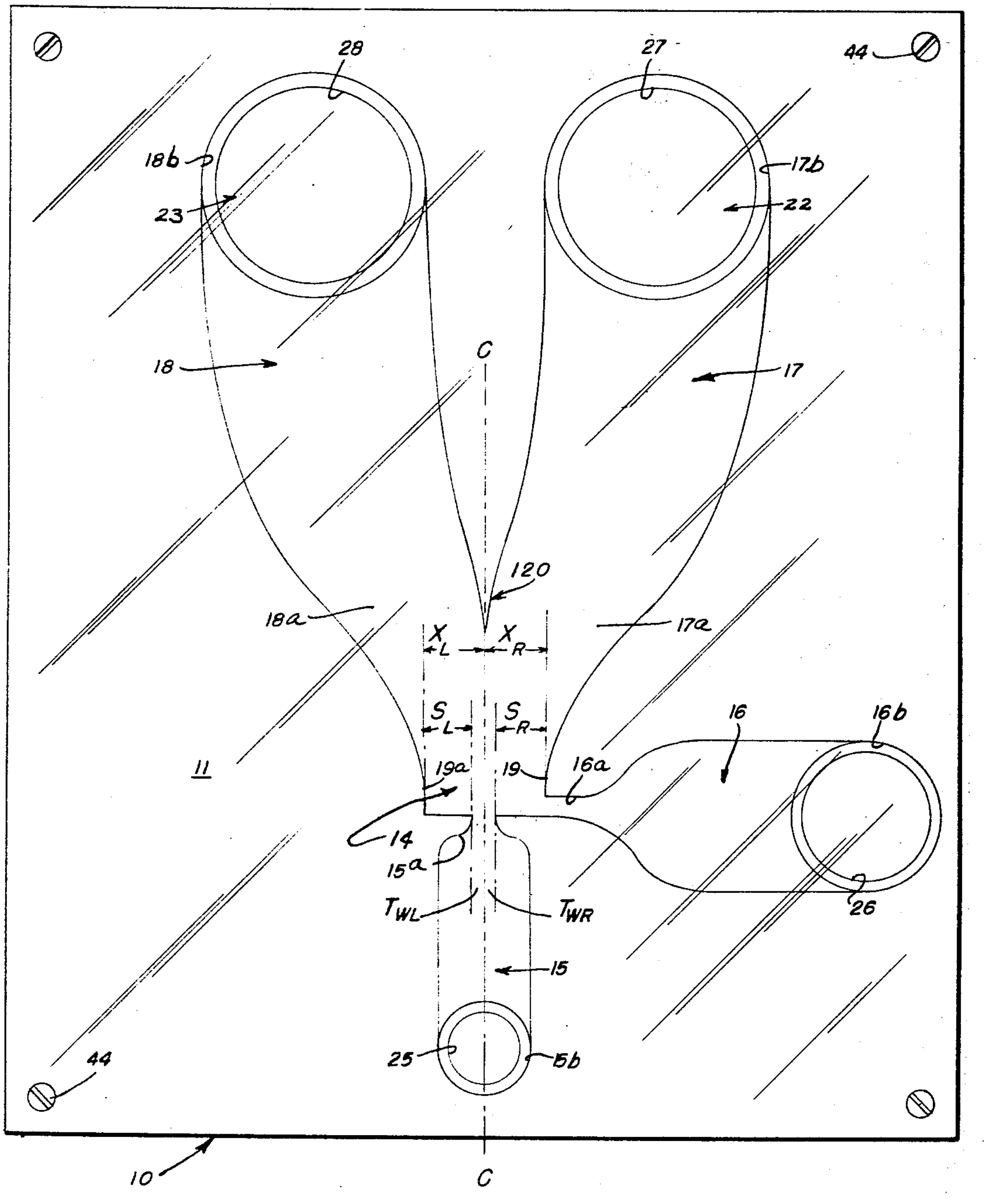
FIGURE 1 is a plan view of a fluid-operated system in accordance with the principles of this invention.
Figure 2A:
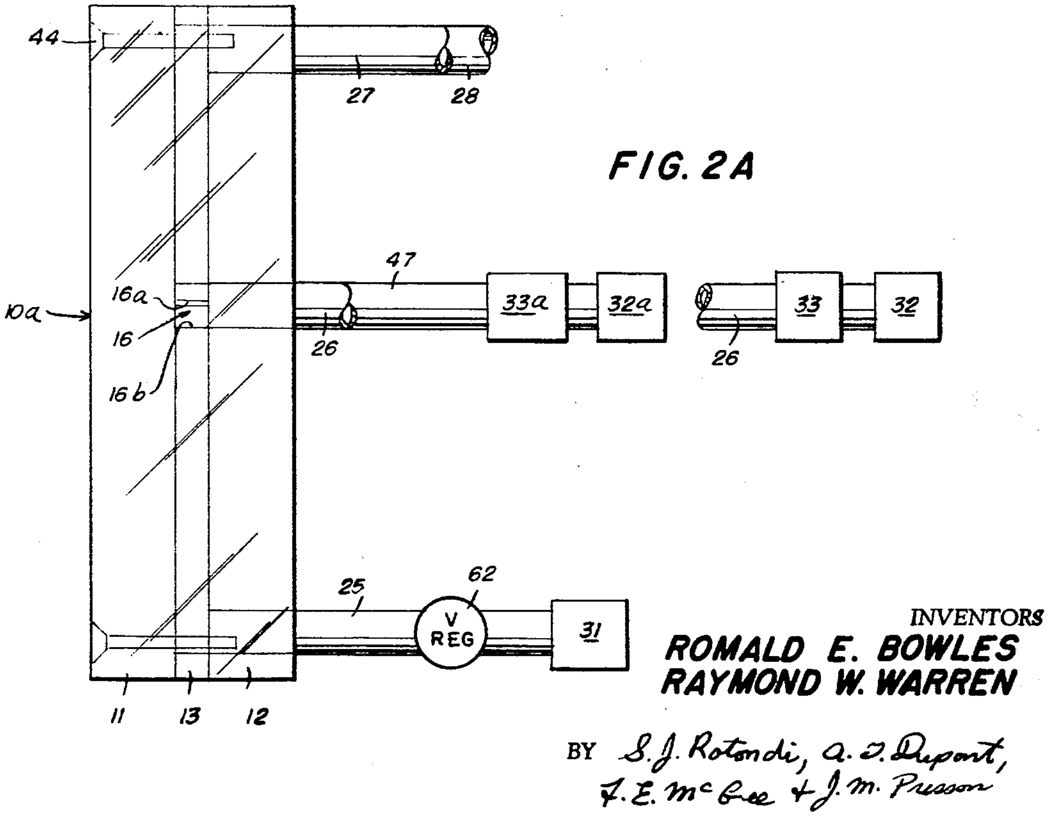
FIGURE 2A is an end view of the embodiment of FIGURE 2 with means for applying fluid to the system.
Figure 2:
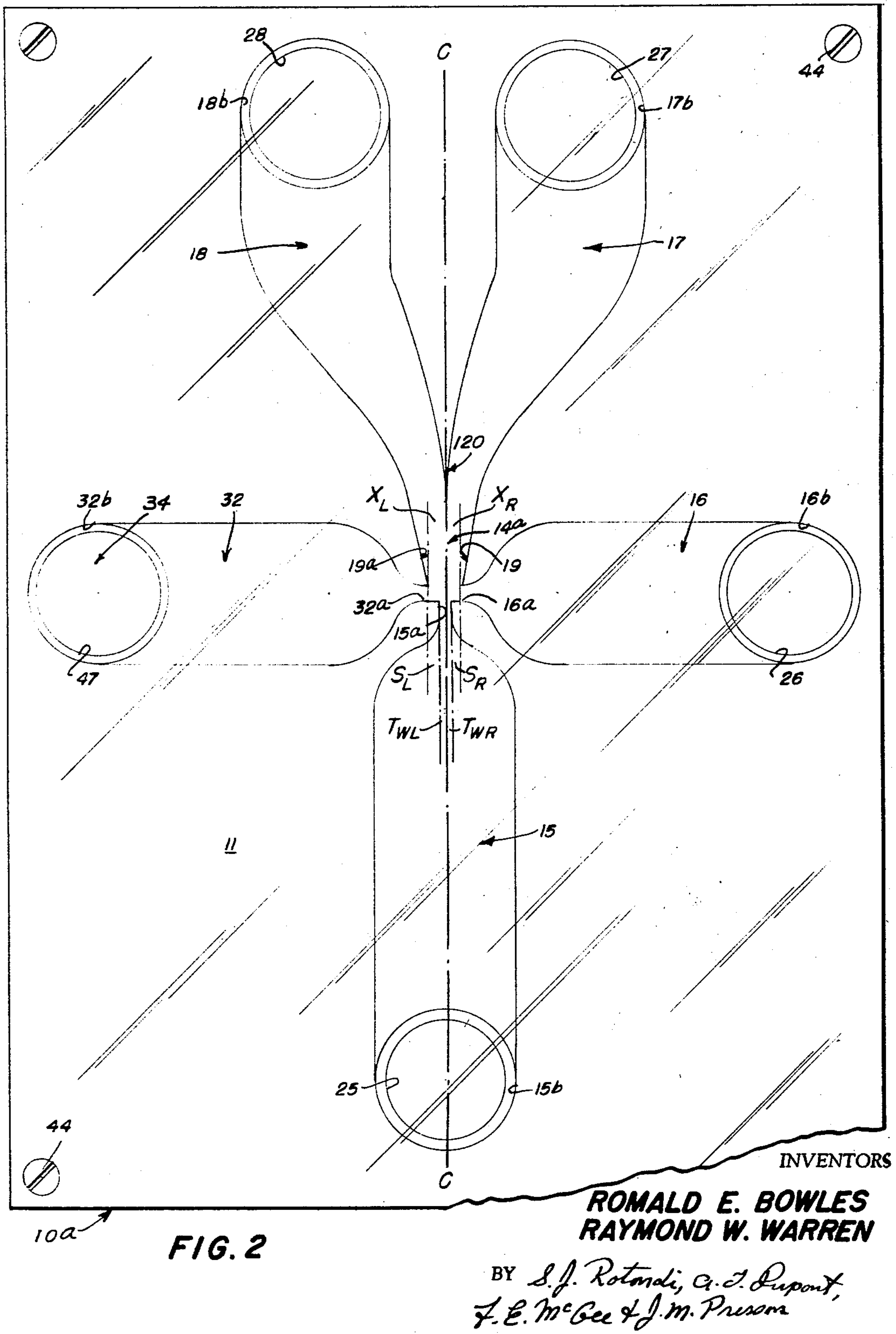
FIGURE 2 is a plan view of another embodiment of the system shown in FIGURE 1.
Figure 3:
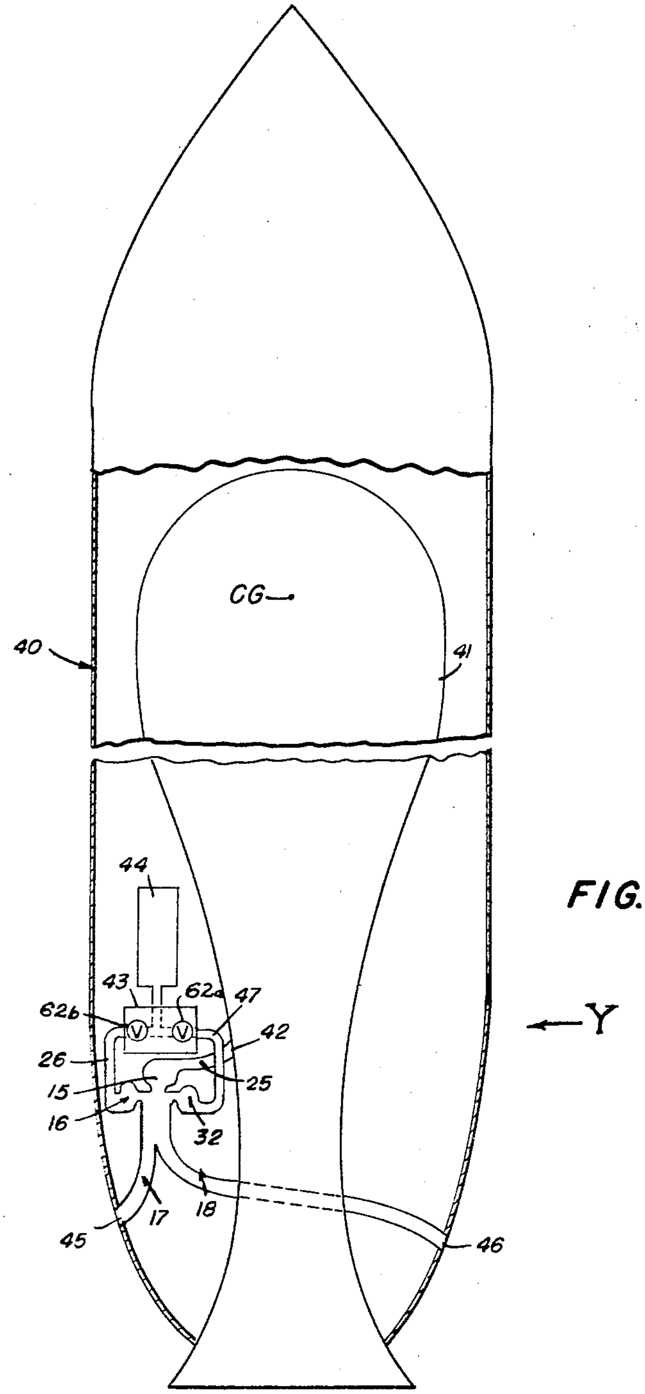
Figure 4:
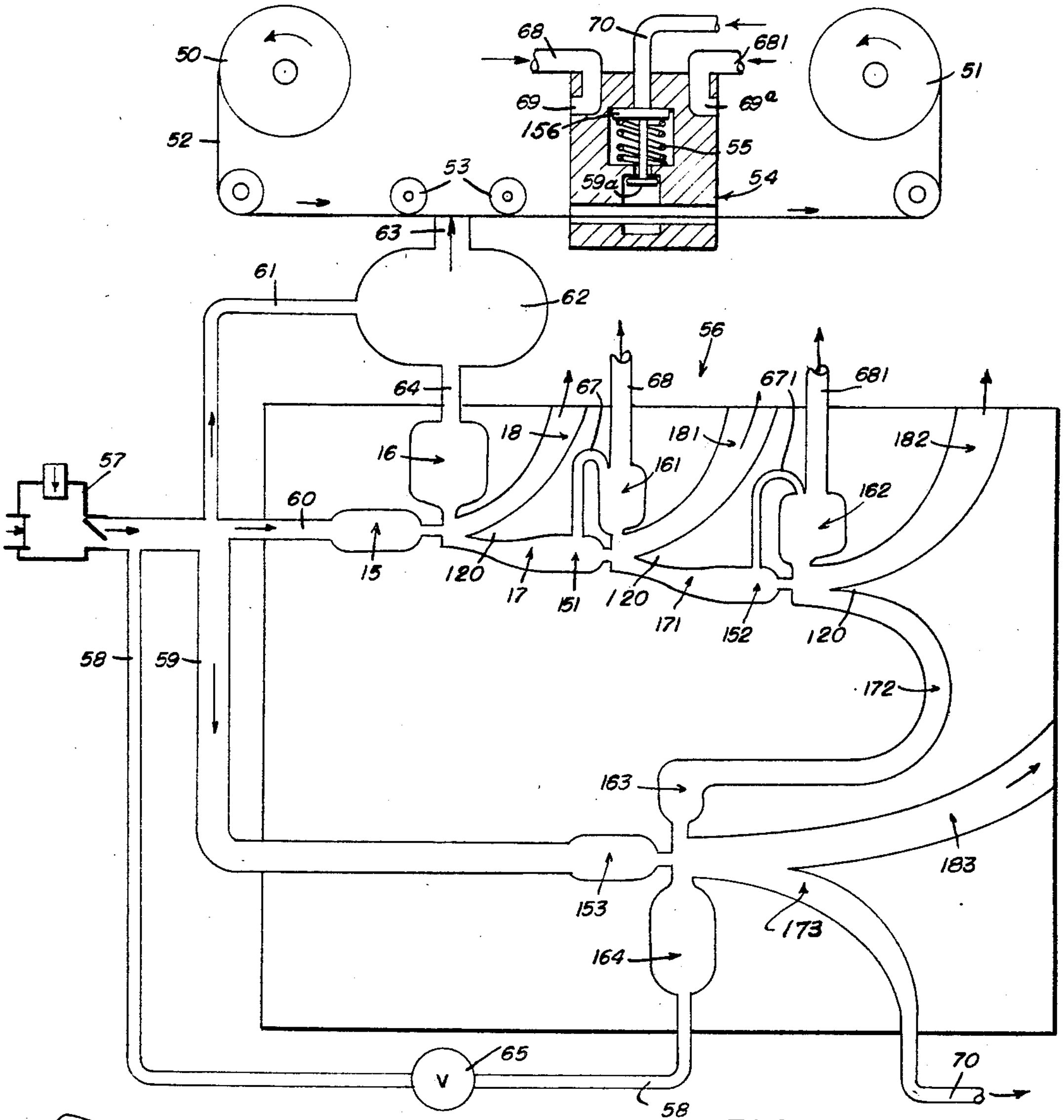
Figure 5:
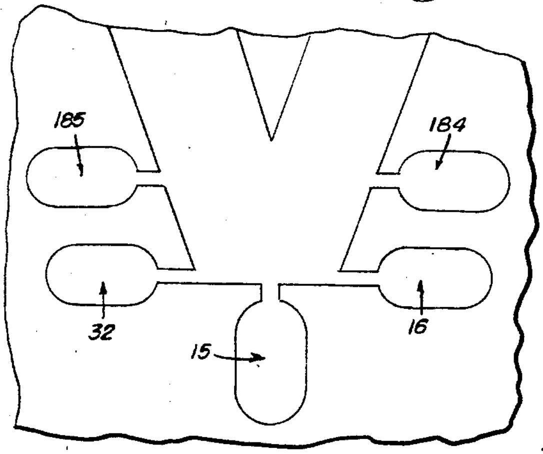
Figure 6:
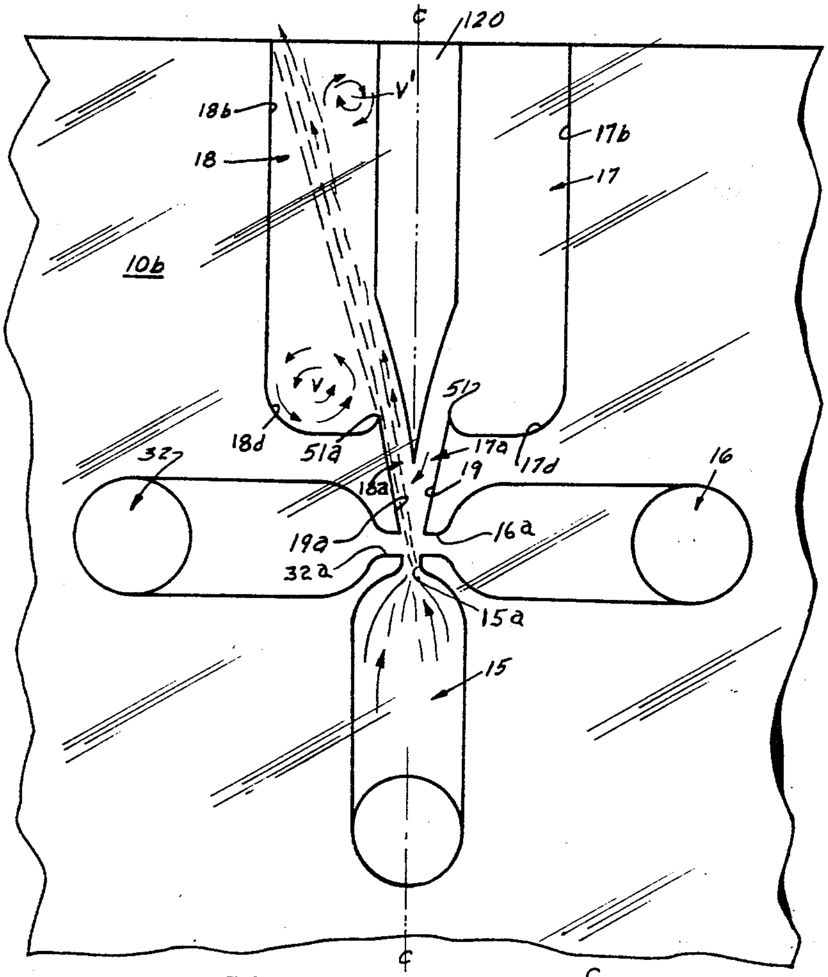
Figure 6A:
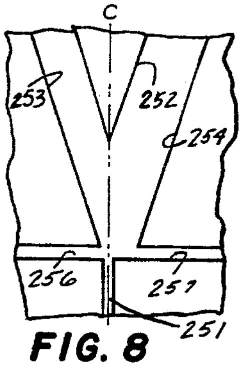
Figure 6A:
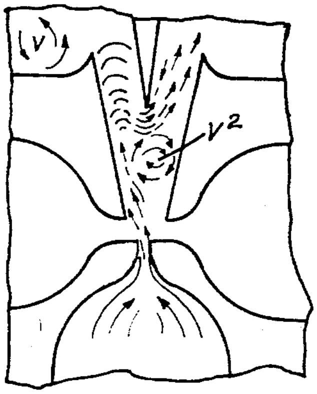
Figure 7:
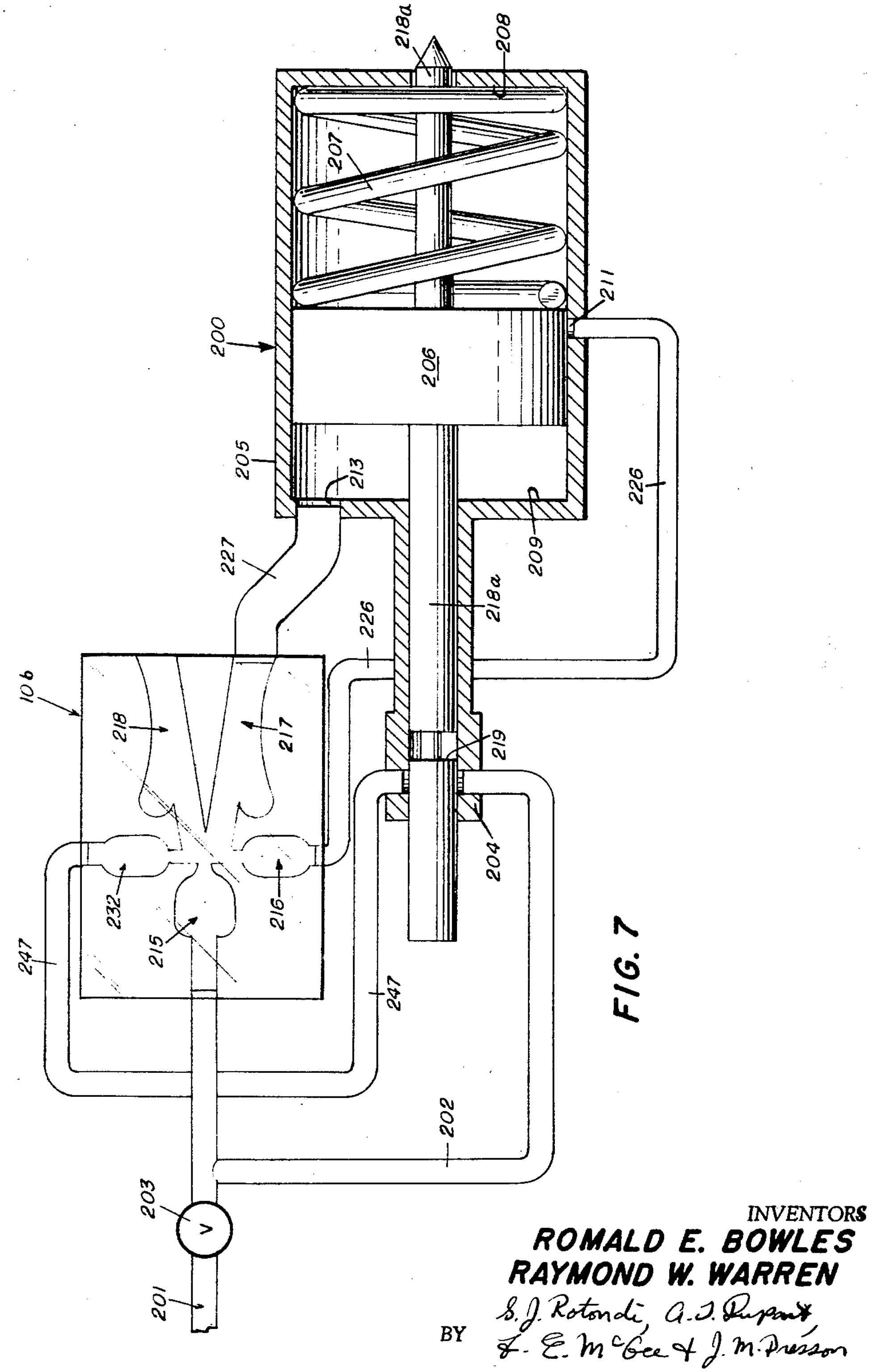

FIGURE 3 schematically illustrates an arrangement for utilizing the system shown in FIGURES 1 and 2;

FIGURE 4 illustrates another arrangement for utilizing the system of this invention;

FIGURE 5 illustrates another embodiment of the fluid-operated system of this invention;

FIGURE 6 is a plan view of the fluid multistable memory system of this invention;

FIGURE 6A is a partial plan view of FIGURE 6;

FIGURE 7 illustrates an arrangement for utilizing the fluid multistable memory system of FIGURE 6; and FIGURE 8 illustrates a plan view of an asymmetrical boundary layer unit.

Figure 1A:
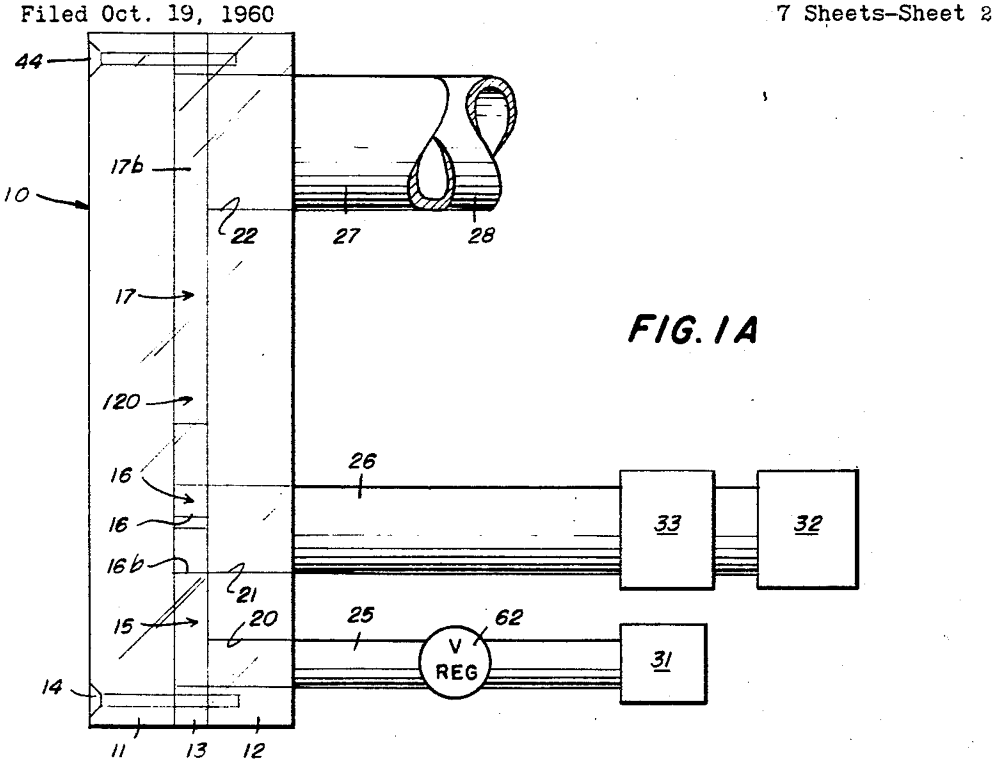
FIGURE 1A is an end view of the system shown in FIGURE 1 with means for applying fluid to the system.

FIGURES 1 and 1A illustrate one embodiment of the multistable fluid-operated system of this invention. The fluid-operated system referred to by numeral 10 is formed by three flat plates 11, 12 and 13, respectively. Plate 13 is positioned between plates 11 and 12 and is tightly sealed between these two plates by machine screws 44. Plates 11, 12 and 13 may be composed of any metallic, plastic, ceramic or other suitable material. For purposes of illustration, plates 11, 12 and 13 are shown composed of a clear plastic material. It will be evident that the plates may be sealed together by adhesives or any other suitable means.

A configuration cut from plate 13 provides a chamber 14, a fluid supply nozzle 15, a control nozzle 16, and apertures 17 and 18. Nozzle 15 and nozzle 16 are adjacent each other and are at substantially right angles. The total pressure of the fluid supplied by supply nozzle 15 will be hereafter referred to as $P_{sn}$. Nozzles 15 and 16 form constricted supply and control orifices 15*a* and 16*a*, respectively, which form apertures in chamber 14. The term "orifice," as used herein, includes orifices having parallel, converging, or diverging walls or any conventional shape. The input ends 15*b* and 16*b* of nozzles 15 and 16 communicate with bores 20 and 21, respectively, (FIG. 1A) formed in plate 12. Output ends 17*b* and 18*b* of apertures 17 and 18, respectively, communicate with bores 22 and 23, respectively, in plate 12.

Orifices 17*a* and 18*a* form openings for apertures 17 and 18, respectively, and can be symmetrically spaced relative to nozzle 15. Dividing blade 120 is used to vary the symmetry between orifices 17*a* and 18*a* and apertures 17 and 18. The leading surface of divider 120 defines the entrance to orifices 17*a* and 18*a*. Both orifices 17*a* and 18*a* have identical cross-sectional areas in this embodiment. A pair of oppositely diverging walls 19 and 19*a* forming chamber 14 join the outer walls of 17*b* and 18*b* of the apertures 17 and 18 and form a smooth continuous surface therewith.

Bores 20, 21, 22 and 23 are internally threaded so that tubes 25, 26, 27 and 28, which are externally threaded, can be tightly held in their respective bores. The end of tube 25 extending from plate 12 is attached to a source of fluid under pressure. This source is designated by numeral 31. The fluid under pressure can be air or other gas, or water or other liquid. Gas, with or without solid or liquid particles, has been found to work very satisfactorily in system 10. Gas can be used in control nozzle 16 to control the flow of a liquid from nozzle 15, or vice versa. Also the liquid may have solid particles or gas bubbles entrained therein. A fluid-regulating valve 62 may also be used in conjunction with source 31 to insure continuous flow of fluid at a constant pressure. Such fluid-regulating valves are, of course, conventional.

Numeral 32, like numeral 31, represents any source of fluid under pressure. Numeral 33 schematically represents any means or condition which causes a fluctuation or variation in fluid pressure in tube 26. Considered together, numerals 32 and 33 can be regarded as any means or condition which causes a variation in fluid quantity or pressure in tube 26.

In order to clarify the boundary layer control feature of this invention, consider a unit of the type illustrated in FIGURE 1. When fluid under pressure is applied to the power nozzle, there is flow through the power nozzle which results in a power jet. Initially the power jet passes through the interaction region substantially undeflected. As a result of viscous interaction between the power jet fluid and the surrounding fluid, the surrounding fluid is accelerated in the power jet direction as a result of momentum exchange. This entrainment of the fluid surrounding the stream transports the fluid on each side of the power jet out of region 14. This action lowers the pressure on each side of the power jet and counterflow fluid from tubes 17 and 18 flows through receiving apertures 17*a* and 18*a* parallel to the walls of interaction region 14 to replace the fluid entrained and removed by the power jet.

The power stream flow through interaction region 14 creates turbulence in interaction region 14 and therefore differential pressure perturbations will exist transverse to the power jet. The pressure perturbations deflect the power jet slightly to an asymmetric flow configuration. The effect becomes asymmetrical to a degree which increases with increasing effective sidewall length. The effective sidewall length can be established by: physically limiting sidewall length or by change of slopes of the sidewalls as shown in FIGURE 1 so as to cause the sidewall divergence to increase or decrease as desired or by location of the leading edge of divider 120 with respect to distance from the exit of power nozzle 15*a* by using the divider as a shield between the power jet and one of the sidewalls 19 or 19*a*. Thus the feedback or degree of power stream asymmetry which will develop for a given power stream deflection and control flow combination is reduced by shortening the effective length of sidewall 19 or 19*a* or by changing sidewall divergence angle B to a large value or by bringing the divider 120 leading edge closer to the power nozzle 15*a* exit. The asymmetry referred to above can exist in the absence of any control fluid flow either into or out of control chamber 16 through control orifice 16*a*. Additional relationships between effective sidewall length and operational characteristics are discussed subsequently.

Assume for purposes of discussion that deflection is towards sidewall 19. This deflection reduces the area between power stream and sidewall 19 and impedes and reduces counterflow from aperture 17*a* into the right boundary region, defined by: right sidewall 19, the interaction chamber end wall, and the power stream; which region is being evacuated by the power stream entrainment. Conversely the counterflow along wall 19*a* into the left boundary region is facilitated by concurrent increase in area between sidewall 19*a* and the power stream through which fluid can flow into the left boundary region as it is being evacuated by the power stream. The extent to which this transverse pressure differential is self supporting depends upon net flow or fluid for each of the two opposing boundary regions. For example in FIGURE 1 the distance between the leading edge of divider 120 and sidewall 19 or 19*a* is large relative to the width of the power nozzle 15*a* ($T_{WL}+T_{WR}$). Consequently for small deflections of the power jet relative to the centerline of nozzle 15*a* a gap exists between the power stream and the sidewall. A similar situation exists when sidewall 19 or 19*a* are terminated at a location closer to nozzle 15*a* than is the leading edge of divider 120. In such cases fluid can flow through this gap to raise the boundary region pressure in the same manner as control flow into the right boundary region though control orifice 16*a* would raise the boundary region pressure. Flow from a receiving aperture location into the boundary region is referred to as counterflow. In this example the counterflow reduces the tendency for further decrease of boundary region effective pressure. In specific units this effect of boundary layer control may be employed to limit the feedback type action and provide a continuously variable control of power stream deflection and consequently amplitude of output signal.

Continuing with the discussion of the unit of FIGURE 1 it is apparent that as the gap between sidewall 19 and the power stream is further reduced the net flow to the right boundary layer is further modified. This modification results in decrease of the right side effective pressure while the left boundary region effective pressure tends to increase towards the ambient fluid pressure level, which in the case of FIGURE 1 is the back pressure of channel 18. The resulting transverse force inclines the power stream towards wall 19. When the sidewall 19 or 19*a* are sufficiently close to the leading edge of the divider 120, the cumulative action results in the power stream contacting wall 19 at an "attachment location." When this happens the power stream establishes a 'sealed" boundary region or layer defined by the end wall of the interaction region, the side wall 19 and the power stream. Flow into the sealed boundary region from receiving aperture 17*a* is now substantially terminated and the pressure in this boundary region is further reduced by power stream entrainment. As a result the attachment location moves closer to the exit of the power nozzle 15*a*.

It is possible to modify the right boundary region (adjacent to sidewall 19) effective pressure by introducing control fluid through control orifice 16*a* so as to increase the effective right boundary region pressure and deflect the power stream towards sidewall 19*a*. It is possible similarly to withdraw fluid from the right bounadry region through control orifice 16*a* so as to reduce the effective right boundary region pressure and deflect the power stream towards sidewall 19. Such control signals may be introduced in response to conventional control means or as an output of another pure fluid amplifier unit (which is exhibited as a change of pressure, mass flow rate, or fluid power) which is applied to control chamber 16.

Consider that a control signal is being applied through chamber 16 and control orifice 16*a* so as to deflect the power stream towards sidewall 19*a*. A larger portion of the power stream will flow to aperture 18*a* than to aperture 17*a*. If the back pressure of output channel 18 is increased as for example by blocking of tube 23, a resulting pressure increase will feed back along wall 19a to the left boundary region raising the boundary region effective pressure. Depending upon the generally concurrent level of control fluid flow from control orifice 16a a level of backloading or back pressure can be applied, for example as the result of such blockage, to provide another type of control action wherein the power stream will be deflected away from wall 19a in response to the back pressure control signal.

In FIGURE 2 the curved or changing slope of the sidewalls of FIGURE 1 are modified to provide flat diverging sidewalls between the exit of the power nozzle 15a and the location of the leading edge of the divider 120. In addition a second or left control orifice 32a is provided so that control signals applied to control chamber 16 can be opposed by similar control signals applied to control chamber 32. It is apparent that more than one control orifice and its associate control signal can be applied to one or all boundary regions and this is illustrated in FIGURE 5.

FIGS. 2 and 2A illustrate a modification of the multistable fluid-operated system shown in FIGS. 1 and 1A, wherein like numerals refer to like member or elements. This modification is designated numeral 10a. In system 10a a second control nozzle 32 is positioned horizontally opposite the control nozzle 16. Control orifices 16a and 32a are substantially of the same diameter and vent into chamber 14. Input end 32b of nozzle 32 communicates with tube 47 threadedly fixed in bore 34. Numerals 32a and 33a represent means which are equivalent to the means referred to by numerals 32 and 33, respectively. Fluid-regulating valve 62 insures that the system 10a receives a constant fluid pressure from source 31.

In FIGURE 2 the divider 120 leading edge is located approximately eight "power nozzle exit widths" from the exit of the power nozzle 15a. The angle between power nozzle 15a, centerline *c—c* and the sidewall 19 is defined as $B_R$ and equals approximately 12°. The unit is substantially symmetrical about the power nozzle centerline. These dimensions provide a unit which exhibits "lock on" wherein the power jet attaches to one or the other of sidewalls 19 or 19a as a result of entrainment asymmetry in the absence of a control signal or in response to a control signal, and remains in this flow condition even if all control signals cease. Upon application of an opposing control signal of sufficient magnitude the power stream flow will switch to the opposite output channel so that a flip-flop or bistable type action can be provided. When the power stream is deflected for example towards sidewall 19 by a transverse effective pressure differential between the boundary regions, the power stream is curved and often has a velocity component towards the sidewall at the attachment location. In such cases, when the power stream attaches to the sidewall 19 a local pressure distribution is developed which modifies this component of local power stream flow. This local pressure increases feeds back into the adjacent boundary region and causes the boundary region pressure level to be higher than it would have been had the power stream local flow been parallel to the side wall at the attachment location. This effect and the previously described interacting features of the various fluid flows limit attachment location with respect to minimum distance from the power nozzle exit plane for any particular configuration and power stream momentum.

It is apparent that if the setback distance, for example, of the FIGURE 1 configuration is reduced for instance to that of FIGURE 2, the attachment location is closer to the nozzle exit for a given power stream initial momentum since the transverse distance through which the stream must be deflected is reduced.

It is also apparent that in the unit illustrated by FIGURE 2, for a given setback the attachment location distance from the power nozzle exit increases as the sidewall divergence angle $B_R$ increases. While FIGURE 2 illustrates divergence angles B of the order of twelve degrees and FIGURE 3 illustrates divergence angles B of approximately zero degrees, it is apparent that other angles are useable. This divergence angle B, the setback S, the power nozzle exit width $(T_{WL}+T_{WR})$, and the effective sidewall length previously described provide interrelated effects on the power stream flow. For example, for a given type of fluid, fluid speed, and fluid thermodynamic state, the previously described dimensional parameters are parameters of the performance of a unit. For example consider a unit which has a left wall with zero setback, a left wall divergence angle $B_L$ of zero and no effective length of right sidewall i.e. $B_R$ equals ninety degrees. When the power stream is started it will lock on the left wall, 19a. Next, for purposes of clarity, let this sidewall 19a slowly rotate counterclockwise about its junction with the end wall of the interaction region 14. The power stream will remain locked to the side wall 19a until an angle $B_{L\,max}$ is exceeded at which condition the power stream will detach from sidewall 19a. For $B_L$ greater than $B_{L\,max}$ the power stream can be deflected to an attached flow configuration by a control signal but will detach when the control signal ceases. Next let $B_L$ decrease to $B_{L\,max}$. In this generalized case, the power stream will not reattach in the absence of a control signal. $B_L$ must be further decreased to a value $B_{L\,min}$ at which condition the power stream will reattach without a control signal. For $B_L$ less than $B_{L\,max}$ and greater than $B_{L\,min}$ therefore the power stream can be deflected to a lock-on condition by a control signal and will remain locked on when the control signal ceases.

Most of the previous discussion refers to submerged jets, for example a liquid jet surrounded by an ambient liquid or a gas jet surrounded by an ambient gas. The properties of the power jet fluid and the properties of the ambient fluid are parameters of the entrainment characteristics. Thus these properties affect the operational characteristics of the interaction region. An extreme effect of these parameters occurs when the power jet is liquid and the ambient surrounding fluid is gaseous or a vapor. This extreme condition is known in the art as a "free jet." The finite values of $B_{L\,min}$ and $B_{L\,max}$ are usually different for a free and submerged jet; also the attachment angle $B_{L\,min}$ is generally considerably smaller for a free jet flow than for a submerged jet flow. Thus for a given operational characteristic it is important to recognize that the detail interaction region shape required is a function of the ambient fluid properties as well as the power jet fluid properties.

An additional effect is that of sidewall inclination at the attachment location. Inclination of this sidewall location in the direction of power stream deflection reduces the change of local static pressure developed by attachment of the power stream to the side wall relative to that pressure which is developed by attachment at the same spatial location for a side wall which is parallel to the power nozzle 15a centerline. This variable permits a still lower effective pressure to be developed in the adjacent boundary region.

Referring again to FIGURES 2 and 2a, it is significant that a control signal can be applied by a combination of flows through the control orifices wherein each control flow may be a flow into or out of the boundary regions. Further the control flow affects the power stream flow path even if the control flow has no component of momentum transverse to the original power stream direction as the control fluid exits from or enters control orifices. A control fluid having a transverse momentum component can be used however cooperatively with the boundary layer control characteristics of this invention to enhance operational characteristics of the amplifier. Thus these units may employ a combination of boundary layer control and momentum effects.

Some of these boundary layer control effects make use of momentum exchange between the power jet and its surrounding fluid. Momentum exchange or entrainment is present to varying degrees whenever a fluid jet passes through a region not at zero pressure. Such entrainment together with friction type losses, etc., degrade the power stream as it travels away from the power nozzle exit. These losses increase with distance from the power nozzle exit and therefore as a general statement, from the standpoints of output pressure level and output power level, it is desirable, within limits, to locate the receiving apertures as close as possible to the power nozzle exit. The location of the receiving apertures 17*a* and 18*a* of FIGURE 2 are determined by the divider 120 leading edge since, in order to provide lock-on characteristics, the divider 120 apex should be located relatively close to or downstream of the power stream attachment location. Thus in general for lock-on units of the type shown in FIGURE 2, it is desirable to cause attachment to occur close to the power nozzle exit.

As previously indicated the operation of a specific unit as a particular type of device is also a function of the pressure of the power stream. The operation of the unit of FIGURES 2–2*a*, described above, depends upon the fact that the power stream does not concurrently contact both side walls 19 and 19*a* upon exiting from the power nozzle 15*a*. In the case of a compressible fluid, when the power jet supply pressure is increased to the extent that the stream expands and does concurrently attach to both side walls 19 and 19*a*, the stream is equally effective in lowering the boundary layer pressure between the stream and each side wall. In the absence of a control signal, the pressure on each side of the stream is lowered substantially equally and there is little or no transverse differential effective pressure. The stream is thus not deflected and if the divider 120 is symmetrically located between the side walls 19 and 19*a* the stream divides substantially equally on each side of the divider 120 into the receiving apertures 17*a* and 18*a*.

Under these flow conditions, sufficient control flow is now introduced, for example, through orifice 16*a* to raise the pressure in the right boundary layer region, the stream detaches from the adjacent side wall 19 and is deflected toward the opposite side wall 19*a*. The stream is now far more effective in removing fluid from the left than the right boundary layer region and a major portion or all of the stream then issues from the outlet 18*a* opposite to the control flow of orifice 16*a*. When the control flow from orifice 16*a* ceases the power stream again attaches to both side walls 19 and 19*a* and returns to its original symmetrical flow configuration.

Using this type of boundary layer control, a small control flow deflects a very large power jet. Using control and power orifices of the same area and configuration, a 2 pound per square inch change of control air pressure on one side will cause sufficient change of control fluid flow to switch the major portion of a 90 pound per square inch gage air power jet from this symmetrical flow configuration to an asymmetrical flow configuration.

As an example of one type of operation to which the apparatus of FIGURE 2 may be applied, the apparatus may be employed as a fluid signal comparator for either pressure, mass flow or power of a fluid. A signal of a predetermined amplitude may be applied to control orifice 16*a*, which causes the power stream to initially lock onto the left side wall 19*a*. If now a signal is applied to control orifice 32*a*, the power stream deflects to a right side wall 19 only when this latter signal exceeds by a predetermined magnitude the signal applied to orifice 16*a*. Thus, whenever output flow is switched to the output channel 17, the signal applied to orifice 32*a* exceeds a predetermined value as determined by the magnitude of the signal applied to orifice 16*a*. This is a typical comparator action. Variation of the signal applied to the orifice 16*a* permits the comparator level to be selected at will. The signals referred to above may be applied by adding or subtracting fluid from the interaction chamber through the control orifices.

As shown in FIG. 1, walls 19 and 19*a* of chamber 14 oppositely diverge to form walls of apertures 17 and 18. Walls 19 and 19*a* may also be parallel throughout their entire length. Wall 19 is set back a distance $S_R$ from the edge formed by the intersection of control orifice 16*a* and supply orifice 15*a*. $S_L$ represents an equal distance between the left edge of supply orifice 15*a* and a point on wall 19*a* which is horizontally opposite the lower edge of control orifice which, of course, is the edge referred to above.

The fluid stream issues from nozzle 15 at a total pressure $P_{sn}$, where values of P are in pounds per square inch gauge. The dimensions $X_R$ and $X_L$ in FIGURES 1 and 2 are the respective horizontal distances between the centerline C—C and the closest point on walls 19 and 19*a*, respectively. Vertical centerline C—C is intermediate orifice 15*a* the opposite sides of walls 19 and 19*a* of chamber 14, and aperture orifices 17*a* and 18*a*. $T_{WR}$ is the horizontal distance between the vertical centerline C—C and the closest point on the right wall of supply orifice 15*a*. The dimension $T_{WL}$ is the horizontal distance between the centerline C—C and the closest point on the left wall of supply orifice 15*a*. $\alpha_R$ and $\alpha_L$ are ratios of $$\frac{S_R\ (\text{in.})}{T_{WR}\ (\text{in.})} \text{ and } \frac{S_L\ (\text{in.})}{T_{WL}\ (\text{in.})}$$

respectively.

Because opposite walls 19 and 19*a* of the chamber are set back from the lower edge of control orifice 16*a*, a region where the velocity of the fluid is lower than the velocity of the main fluid stream issuing from nozzle 15 occurs adjacent walls 19 between the lower edge of walls 19 and aperture orifices 17*a* and 18*a*. This region of fluid moving at a slower speed than the main stream of the fluid issuing from nozzle 15 will be hereafter referred to as an artificial boundary layer or region. The effect of such a region is to cause the fluid from nozzle 15 to lock-on to one side of the wall 19 when there is a flow of fluid from nozzle 15. If fluid is introduced into this region from some suitable source, such as a control nozzle, the effect will be to nullify or reduce the lock-on effect. This feature provides boundary layer control of the fluid stream.

In FIGURES 1 and 2, divider 120 is positioned with its leading edge a distance approximately eight throat diameters from throat 15*a*. Also divider 120 is positioned to bisect chamber 14 so that orifices 17*a* and 18*a* are symmetrical and alpha is 2. If alpha is this value or smaller and values of $P_{sn}$ are greater than 80 p.s.i.g., then the fluid stream will flow symmetrically or in equal proportions into apertures 17 and 18. The stream is thus in the so-called "neutral state" because it divides equally into each aperture. For the aforementioned values of alpha and $P_{sn}$, the flow condition is stable. If values of alpha are greater than 2 and values of $P_{sn}$ are less than 60 p.s.i.g., then the "neutral state" is unstable and the flow will be easily disturbed to an asymmetric flow pattern by a small perturbation or force applied thereagainst.

In the absence of fluid flow from the control nozzles, when values of alpha are small, that is, less than 2 with values of $P_{sn}$ greater than 80 p.s.i.g., and $\alpha_L$ equals $\alpha_R$, then the proportion of quantity of flow to apertures 17 and 18 will be approximately equal. Thus, the fluid stream will be in the stable neutral position and the flow will be symmetrical.

When values of alpha are greater than 2 with values of $P_{sn}$ less than 60 p.s.i.g., and $\alpha_L$ equals $\alpha_R$, any perturbation will cause immediate asymmetrical flow into one of the apertures. For larger values of alpha, the tendency of the stream to lock-on to the side of wall 19 opposite that from which the perturbation is applied will increase up to values of $\alpha$ where the stream cannot lock-on, due to remoteness of walls 19 and 19*a*.

When values of alpha are small or large and $\alpha_L$ does not equal $\alpha_R$ because dividing blade 120 is moved relative to centerline C—C so that one aperture orifice is smaller in size than the other, the flow will not be symmetrical and boundary layer control will occur causing the fluid stream to lock-on to that side of wall 19 or 19*a* which is spaced farthest from the divider 120, unless $\alpha$ is so large that the stream cannot lock-on due to remoteness of walls 19 or 19*a*.

If divider 120 and side walls 19 and 19*a* are symmetrically positioned with respect to orifice 15*a*, the fluid flow will be symmetrical when alpha is less than 2, $P_{sn}$ is greater than 80 p.s.i.g., and when there is no flow from either control nozzle 16 or 32. Under these conditions, if a fluid flow $\alpha$ is introduced from one control nozzle, for example, nozzle 16, because of the boundary layer control, the main fluid stream from nozzle 15 will switch its predominant flow into aperture 18 which is opposite control nozzle 16. When there is no flow from either control nozzle, the fluid stream will return to the neutral or equally divided flow configuration. Should there be simultaneous flow from both control nozzles 16 and 32, that control nozzle which provides the greatest quantity or proportion of fluid to the boundary layer of the jet issuing from nozzle 15 will cause the stream to move with a definite switching action into that aperture opposite that nozzle providing the overriding fluid stream. Successive alternate overriding increases in fluid quantity from the respective control nozzles will cause successive, alternate stable movements of the fluid stream from one aperture to another. This effect is hereafter referred to as "multiple switching."

If divider 120 is asymmetrically positioned with respect to nozzle 15 when alpha is greater than 2, but less than the limiting value, and $P_{sn}$ is less than 60 p.s.i.g., in the absence of fluid from either control nozzle all of the flow will pass through one aperture which has the largest inlet orifice. The flow from either control nozzle may be steady or pulsed. The fluid stream will remain switched in that aperture into which it was last commanded by the control nozzle, even when there is no additional flow from the control nozzle. When fluid flows from both control nozzles simultaneously, if the flow from one control nozzle is sufficiently greater than the flow which issues from the other control nozzle, the nozzle having the greater fluid flow will deflect the fluid stream issuing from nozzle 15 by modification of the boundary layer pressure distribution. As a result, the main fluid stream from nozzle 15 will deflect completely due to the boundary layer control effect. Also, successive alternate overriding increases in flow from the respective control nozzles will cause successive switching of the fluid stream issuing from nozzle 15.

Since small pressures from control nozzles 16 and 32 cause large deviations in the movement of the higher energy fluid stream from nozzle 15; in each embodiment, the effect of the fluid from either control nozzle is amplified.

Values of alpha and $P_{sn}$ will vary in conforming to the requirements of any particular embodiment. It is, therefore, not our intention to limit the invention to particular values of alpha and $P_{sn}$.

Those skilled in the art will realize that for certain determinable widths of divider 120 and aperture wall spacing, modification of systems 10*a* and 10*b* are provided which will permit the systems 10*a* and 10*b* will permit the fluid stream to lock on to either wall of divider 120 in addition to walls 19 and 19*a*. This feature is termed "multistable switching" because the fluid stream can be stable, that is can remain locked on any one of four possible walls against which is directed by fluid pressure applied by either or both control nozzles.

FIGURE 3 illustrates one possible embodiment which utilizes the system shown in FIGURE 2 where orifices 17*a* and 18*a* and apertures 17 and 18 are symmetrical. As shown in FIGURE 3, numeral 40 designates a missile having a rocket booster or sustainer 41. When the missile is launched, a small proportion of the exhaust gases from the booster 41 enters port 42 formed in the side of the booster. These gases pass through tube 25 so that nozzle 15 supplies hot pressurized gas in equal proportions to the apertures 17 and 18. The ends of tubes 47 and 26 are connected through valves 62*a* and 62*b* to a source 44 of compressed gas, such as nitrogen. Inertial guidance unit 43 is capable of alternately opening and closing valves 62*a* and 62*b* in response to yaw of missile 40. A source 44 of compressed gas, such as bottled nitrogen, provides the fluid supply for control nozzles 16 and 32 and communicates with tubes 47 and 26 through guidance unit 43 and valves 62*a* and 62*b*, respectively.

As will be evident to those skilled in the art, any yaw in missile 40 will be sensed by gyroscopes or other conventional sensing devices in the inertial guidance unit 43, and this unit will thereupon mechanically open either valve 62*a* or 62*b* so that either tube 47 or 26 communicates with source 44. As a result, one of the control nozzles 16 or 32 will issue a jet of nitrogen and the hot gases issuing from nozzle 15 will exit from either port 45 or 46 in the side of missile 40. For example, should the missile yaw in the direction of arrow Y, unit 43 will sense the change of course and open valve 62*a* so that the jet from nozzle 15 will pass through aperture 17 and out port 45. Hot gases so vented create a reactive force sufficient to rotate missile 40 about its center of gravity until the missile is on its proper course again.

The system shown in FIGURE 3 may also be used to control pitch of the missile by appropriately positioning additional opposed apertures so that they vent from the outer surface of the missile. A conventional inertial guidance unit which senses roll can be used to open valves similar to valves 62*a* and 62*b* to the control nozzles so that any roll is compensated for by reactive forces produced by hot gases from booster 41 exiting tangentially from the surface of missile 40.

FIGURE 4 illustrates another embodiment which employs the systems shown in FIGURES 1 and 2, but in which apertures 17 and 18 and orifices 17*a* and 18*a* are asymmetrical. One method used to provide asymmetry is by moving the flow splitter or divider 120 closer to aperture 17 so that the jet from nozzle 15 will not divide equally into apertures 17 and 18.

In this embodiment, a pair of rolls 50 and 51 are rotatably mounted so as to feed a continuous strip of metal or other material 52 in the direction of the arrow to punch press 54. In order to operate punch press 54 safely and efficiently, two conditions should be present. The first condition is that strip 52 be available to be fed under punch 59*a* and the second condition is that the hands of the operator should be away from punch 59*a* before it severs material from strip 52. As shown, punch 59*a* is actuated by a piston 156. Punch 59*a* is ordinarily pressed out of contact with strip 52 by coil spring 55. In order to insure that both conditions simultaneously occur before punch 59*a* is actuated, the systems shown in FIGURES 1 and 2 are combined and all of the apertures are asymmetrically positioned relative to the supply nozzles and the orifices of the supply nozzles by asymmetrical placement of divider 120. The system is combined in a separate unit 56 and is composed of the same laminated structure as the individual systems illustrated in FIGURES 1 and 1A and in FIGURES 2 and 2A.

Unit 56 includes a source of pneumatic pressure 57 capable of supplying continuous air pressure to four pipes 58, 59, 60 and 61. Pipe 61 communicates with a storage tank 62. Pipe 63, extending from tank 62, vents to the atmosphere at a very slow and constant rate when strip 52 blocks the end of pipe 63. Rollers 53 insure that the strip 52 provides a relatively tight continuous cover for the end of pipe 63. When strip 52 no longer covers pipe 63 because the supply from roll 50 is exhausted or because the strip 52 is broken, pipe 63 will be able to immediately vent substantially all of the air from tank 62 to the atmosphere. Tube 64 extending from tank 62 communicates with control nozzle 16. Control nozzle 16 is substantially identical to control nozzles 161, 162, 163 and 164, the latter nozzles comprising the control nozzles for unit 56. Tube 60 connects source 57 to nozzle 15. Nozzles 151, 152 and 153 are similar in construction to nozzle 15 and form supply nozzles for system 56. Tube 58 connects control nozzle 164 through valve 65 to source 57. Aperture 17 and identical apertures 171, 172 and 173 are all asymmetrical with respect to aperture 18 and identical apertures 181, 182 and 183, respectively, because of the asymmetrical position of divider 120. Tube 67 connects aperture 17 to nozzle 161, while identical tube 671 connects aperture 171 to nozzle 162, as shown.

Initially the jet from supply nozzle 15 will flow entirely into aperture 18 because of the asymmetry between apertures 17 and 18. Air entering apertures 18 and identical apertures 181 and 182 vents out of system 56 to the atmosphere. When control nozzle 16 issues a jet of air because strip 52 covers tube 63, the jet from nozzle 15 will switch from aperture 18 into aperture 17 because of the artificial boundary layer control effect discussed above. Thus, before supply nozzle 151 receives air the first condition that tube 63 be covered by strip 52 must be met.

A proportion of the air entering aperture 17 passes through tube 67 and into control nozzle 161. Tube 68 connects nozzle 161 to port 69 in the side of punch press 54. If the port 69 is open (as shown), the air from tube 67 will pass through tube 68 and out port 69 to the atmosphere. Thus, unless port 69 is covered by the palm of one of the operator's hands, no air will issue from nozzle 161 with the result that the remaining air issuing from nozzle 151 will pass through aperture 181 and out of unit 56. However, if the port 69 is covered by the operator's palm, tube 68 will be blocked and the air from tube 67 will add additional air to control nozzle 161 causing nozzle 161 to issue a jet and deflect the jet from supply nozzle 151 into aperture 171.

Similarly, if port **69*a* is not covered by the palm of the operator's other hand, the air from tube 671 will vent out of system 56 through tube 681, but when the port 69*a* is covered, tube 681 will be blocked and the control nozzle 162 will issue a jet of air sufficient to produce the boundary layer control effect so that the air from supply nozzle 152 enters aperture 172, rather than aperture 182**.

Supply nozzle 153 is supplied with air from source 57 through tube 59. Air issuing from control nozzle 163 will cause the jet from nozzle 153 to enter aperture 173. Tube 70 is connected to the end of aperture 173 and communicates with the piston 156, so that air from nozzle 153 will depress punch 59 against the resilience of coil spring 55 sufficient to cause punch 59 to sever material from the strip 52.

Control valve 65 provides an additional safety feature in that should the operator's supervisor see an unsafe condition, he can immediately open valve 65 so that an overriding air jet of considerable pressure will issue from control nozzle 164. This jet will cause switching of any air from aperture 173 to aperture 183, where it will vent out of unit 56.

The fluidic amplifiers of FIGURE 4 constitute a gating system and the individual amplifiers are gates.

FIGURE 5 illustrates another possible embodiment wherein multiple control jets are used to deflect the fluid stream issuing from nozzle 15. Control nozzle 184 and 185 are similar to control nozzles 16 and 32, and as will be evident to those skilled in the art, the control nozzles 184 and 185 can be made responsible to any predetermined condition so as to provide additional control of the jet issuing from nozzle 15.

It should be evident that more than two control nozzles and receiving apertures may communicate with chamber 14. The nozzles and apertures can be positioned such that switching into any one of a number of apertures can be effected.

FIGURE 6 illustrates the fluid multistable memory system **10*b* in accordance with this invention. In FIGURE 6, like numerals refer to like parts in FIGURES 2 and 2A. System 10*b* is formed of the same laminted structure of plates as systems 10 and 10*a*** and is provided with bores communicating with the input ends of the supply and control nozzles. Suitable tubes can be threadedly secured in these bores as will be evident.

System **10*b* is provided with walls 19 and 19*a* which are set back as disclosed above. However, walls 19 and 19A do not form smooth continuous surfaces between the outer walls 17*d* and 18*d* of apertures 17 and 18, as they do in FIGURES 2 and 2A. Rather, walls 17*d* and 18*d* are provided with an abrupt change in slope at edge 51. The abrupt change in slope is shown as being substantially hook-shaped in these figures and walls 17*d* and 18*d* intersect walls 19 and 19*a*, respectively as pointed edges 51 and 51*a*, respectively. While the change in slope is shown as hook-shaped any abrupt change of slope sufficient to create a fluid vortex system can limit boundary layer feedback across the abrupt change of slope. In addition to the abrupt change in slope at edge 51 and 51*a*, system 10*b* provides that the opening between wall 19 and blade 120, as well as the spacing between wall 19*a* and blade 120, is larger than that required for flow of the fluid stream from supply orifice 15*a***.

Briefly, this arrangement allows for flow of the fluid stream into apertures **17*a* or 18*a* along walls 19 or 19*a*, respectively, and after partial or complete flow reversal caused by aperture back pressure, flow out of aperture 17*a* or 18*a* along divider 120 and around the end of the blade and into aperture 18*a* or 17*a* respectively. Partial or complete reversal of flow in either aperture is caused by partial or complete closure of the output and 17*b* or 18*b*** of the channels.

When equal sensitivity is desired for control signals to right and left control nozzles 16 and 32, divider 120, walls **17*d* and 18*d*, walls 19 and 19*a* and supply orifice 15*a* are preferably symmetrically positioned with respect to centerline C—C. The output ends 17*b* and 18*b* of channels 17 and 18** normally vent to the atmosphere or communicate with some suitable load.

System **10*b*** is described above as having a memory. The term "memory," as stated above, refers to the characteristic of the fluid stream to persist in trying to exhaust into the aperture through which it is initially directed by fluid flow from one of the control nozzles even after the control fluid flow has ceased, and despite partial or complete blockage of discharge from that aperture.

System **10*b* differs from systems 10 and 10*a* because in the latter two systems flow of the main fluid stream can be permanently switched by aperture back pressure in the absence of a control signal. For example, in systems 10 and 10*a* control fluid flow from nozzle 16 will cause the main fluid stream from nozzle 15 to exhaust through aperture 18. If control fluid flow is terminated and if the downstream static pressure for aperture 17 differs only moderately from the down stream static pressure for aperture 18, then the main fluid stream will continue to exhaust through aperture 18. However, in system 10 and 10*a*, if the downstream static pressure of aperture 18 is raised markedly higher than that of aperture 17 by restriction of the fluid discharge rate from output end 18*b*, then this pressure will feed back along wall 19*a* increasing the boundary layer pressure and cause the fluid stream to shift and discharge through aperture 17*a*. As a result the pressure in channel 18 will drop. Then even if the blockage of channel 18 is subsequently removed, the main fluid stream will continue to discharge through aperture 17*a* until control fluid flow is introduced by nozzle 16. Thus when systems 10 and 10*a* are loaded downstream of aperture 18*a*, it is necessary to continue supplying control fluid flow through nozzle 16 to maintain flow of the main fluid stream into aperture 18*a***.

In system **10*b*, it is not necessary to continue supplying control fluid flow through nozzle 16 to maintain flow of the main fluid stream to aperture 18*a* when the output end 18 is blocked so that the downstream static pressure in channel 18 is raised markedly higher than the downstream static pressure of aperture 17. Thus, system 10*b*** permits intermittent or steady state loading of a system which is controlled by pulsed inputs rather than continuous inputs.

The operation of a particular boundary layer control type of unit as a unit exhibiting lock-on or memory properties is partially a function of the distance between the divider and the power nozzle exit. The influence of divider position on the unit's operational characteristics is effected by both the ratio of pressures at the input and output ends of the power jet nozzle and the pressure drop across the power jet nozzle, as well as by the overall interaction region configuration. As described above, the effect of the interaction region configuration on the operational characteristics of a unit is determined by the average divergence angle between each side wall and the power nozzle centerline, the distance between each side wall and the power nozzle centerline at the minimum displacement location, and the side wall curvatures or contours. For purposes of explanation of the effect of divider location on the operation of a device, a unit is described in which the side walls are planes which diverge at angles of 12° relative to the nozzle centerline and the minimum displacement between the nozzle centerline and each side wall is equal. The side walls are separated at the nozzle exit plane by approximately three nozzle exit widths.

The following discussion of the interrelationship between the position of divider 120 and the operational characteristics of the above unit is limited, for the purposes of clarity only, to use of the fluid "air" supplied at pressures of up to 55 p.s.i. absolute, while the unit output channels are directly connected to an ambient pressure of approximately 15 p.s.i. absolute. The detailed relationship described are also dependent upon type of fluid, fluid thermodynamic state, and minimum local pressures in the unit. The latter parameter is especially important in liquid units operating with local cavitation. The following discussion is for units operating in the absence of control signals unless otherwise specified.

In the above unit, if the divider is 0 to 2 orifice widths downstream from the exit of the power nozzle, the flow divides approximately equally in the absence of control signals but the power jet can be forced to deliver a greater portion of the flow to one side of the divider, or the other by applying a corresponding control signal differential. When the divider is between 0 and 2 orifice width downstream from the power orifice exit, the sidewall influence, in the absence of a control signal, is insufficient to deflect the power jet because the differential force which can be developed as a result of the pressure distribution over an effective sidewall length of 0 to 2 times the nozzle exit width is quite small. However, a pressure differential over this length will have some effect. Even such a short effective length of sidewalls permits a larger deflection as a result of a control signal, than that provided by a pure stream interaction unit. Therefore the force developed is not insignificant during a control signal. In addition to the above factors, the stream is split by the divider before the small force can be effective in the absence of a control signal. As a result, there is virtually no deflection of the power stream for this symmetrical unit wherein the single divider is centrally located and the flow divides substantially equally between the two channels established by the divider and side wall extensions in the absence of a control signal.

A different operational characteristic is provided when the divider of this unit is located between three to four nozzle exit widths downstream of the power nozzle exit. For this configuration, the flow is effected by the boundary layer to a considerable extent such that even in the absence of a control signal, a greater portion of the power jet flow is delivered to one side of the divider than the other. However, for this range of divider locations, the sidewall influence is insufficient to deflect all of the power jet to one side of the divider in the absence of a differential control signal. This is so since the divider is relatively close to the exit of the power jet and the stream must be turned through a large angle to be wholly on one side of the divider. The corresponding differential force which can be developed by the available pressure distribution over a length of 3 to 4 times the orifice width is still small in that there is only a limited area of sidewall and power jet on which the available differential pressures can act.

A still different operational characteristic is provided when the divider of this unit is located between 5 to 11 nozzle exit widths downstream of the power nozzle exit. For this configuration, the power jet flow is effected by the boundary layer to an extent such that even in the absence of a control signal the power jet flow will be delivered entirely to one of the channels established by the divider. However, for this flow configuration, if the outlet of the stream channel is blocked, the power jet will be switched to opposite channel by the resulting backpressure.

In this case, the area of the stream over which the effective pressure differential can operate is relatively large. The power stream is deflected into close proximity with the side wall slightly downstream of or in the vicinity of the divider leading edge and therefore seals off a boundary layer region which is being evacuated by the entrainment action of the power stream on one side and is restricted on the other side by the adjacent sidewall. This results in an increase of the effective pressure differential transverse of the power stream. The increased pressure differential acting on a relatively large area of the stream deflects the jet sufficiently that it flows into one output channel, i.e. to one side of the divider and "locks on" to the adjacent sidewall.

When the output channel is blocked an increased pressure builds up throughout this channel downstream of the divider leading edge and in the region of attachment of the power jet to the sidewall. Further, since the channel outlet is blocked, any additional fluid entering this channel must reverse its flow within the channel and exit through the entrance and flow around the divider to the opposite output channel. In consequence two counterflowing regions of fluid flow are established thereby producing substantial turbulence. This turbulence appears in the vicinity of the region of attachment of the stream to the wall. The turbulence degrades the seal between the power jet and the side wall to an extent that the local high pressure at this point forces additional fluid into the previously "sealed" boundary layer region, As a result, the differential in effective pressure across the stream is reversed and the jet is now deflected to the unblocked output channel. The above effect may be employed in place of or as an addition to the control functions provided by the control fluid flows. Specifically switching of the units may be intentionally effected by blocking the output passage to which flow is directed and cause the fluid flow to be switched to the other output passage.

When the divider of this model is located 12 nozzle exit widths or farther downstream (to infinity) of the power nozzle exit, attachment of the stream to the boundary wall occurs upstream of the divider leading edge. Therefore, when the outlet through which the stream is flowing is blocked, the resulting increase of turbulence and backpressure is downstream of the power stream attachment location. Consequently, the turbulence and backpressure do not affect the attachment region to the extent previously described for divider positions closer to the power nozzle exit. However, the back pressure may initiate reverse flow down the boundary layer to the area of attachment of the stream to the wall. At the area of attachment of the stream to the wall, the stream is being deflected by the wall. The resulting increase in local power stream static pressure distribution at the attachment region together with the viscous effects associate with power stream velocity distribution resist reverse flow into the sealed region so that the sense or direction of the effective differential pressure across the stream is not reversed and the stream remains locked to the original sidewall even though no control signal is being applied. While the outlet passage to which the stream is directed by boundary layer lock-on remains blocked, the stream flows around the divider and issues out of the opposite outlet but maintains dynamic pressure on the blocked outlet. However, for this divided location, even without a sustained control signal, when the blockage is removed the power stream flow returns to its original outlet and ceases to flow around the divider to the opposite channel. The memory characteristic of this type unit may be enhanced by having an abrupt change of slope of the side wall or a hook formed in the side wall but directed away from the stream, as illustrated in FIGS. 6 and 6A.

In the above, the various limits of the range of locations of the divider for a specific type of operation are not precise. A shadowy region exists at each limit in which the unit is capable of either type of operation and is therefore quite sensitive to other parameters in the system such as the type of fluid, pressure of the power stream, exact angles of the side walls, set-back, etc. Also it must be stressed that the limits set forth above are for a specific unit, is described, and vary with variations in the other parameters of the system.

In both the lock-on and memory type units a finite control signal can redirect a larger strength power stream so as to provide a fluid amplifier.

In order to understand the operation of the system 10*b*, assume that a stream of fluid from nozzle 15 has locked-on to wall 19*a* as a result of a previous control fluid flow from nozzle 16 and that there is now no flow from either nozzle 16 or 32. The reason that main stream locks-on wall 19*a* is because of the boundary layer effect produced by flow along wall 19*a* which results in lower local pressures than those existing on the opposite boundary of the main stream. This effect is accentuated by setback $S_L$ and the contour of walls 19*a* (FIG. 2). As the fluid stream flows into aperture 18*a*, it passes an abrupt edge 51*a*. A small portion of the fluid stream, which passes edge 51*a*, diverges outwardly from one side of the main fluid stream after passing edge 51*a* and forms a vortex, as indicated by arrows V, in the semi-circular area 52 formed by walls 18*d* (FIG. 6).

Vortices indicated by arrows $V^1$ and $V^2$ are also formed between the wall of the blade 120 and the other side of the main fluid stream. If the output end 18*b* is obstructed, the main fluid stream cannot freely flow through aperture 18*a*. When the obstruction of channel 18 is sufficient, the main stream will reverse itself and flow back around the divider 120 and into the alternate aperture 17*a* as shown in FIG. 6A. There must be sufficient space between blade 120 and wall 19*a* to accommodate vortex $V^2$, the inflowing main stream, and the overflowing stream. The abrupt edge 51*a* and the vortex V limit the pressure fed to the boundary layer of wall 19*a* from channel 18. The reverse flow of vortex $V^2$ also tends to force the main stream against wall 19*a*. The main stream therefore remains locked-on to wall 19*a*. Thus, the pressure in channel 18 is maintained markedly higher than that of channel 17 by the kinetic energy, i.e., dynamic pressure of the main stream even though the stream overflows around blade 120. Should the obstruction (not shown) of channel 18 be removed, the entire flow will thereupon switch back into channel 18 (FIG. 6) because a portion of the main stream remains locked-on to wall 19*a* and does not lock-on to wall 19 in the absence of a control fluid flow from nozzle 32.

As described above, the eddies $V^1$ and $V^2$ also aid in enhancing the memory feature. Each of these eddies has a component of velocity transverse to the direction of flow of the power stream. Due to momentum interchange between the fluids in the eddies and the fluid of the main stream, the main stream tends to be deflected away from the eddies. It will be noted that in each case the stream tends to be deflected toward a boundary or side wall and therefore the lock-on feature is enhanced.

The eddy V, which is produced as a result of the formation of the hook 51*a* in side wall 19*a*, is also effective in enhancing the memory characteristic. The direction of flow of the fluid in eddy V is such that the counterflowing fluid in the region 18 to the left of the power stream flows into the eddy region and assumes the flow pattern indicated; this is counterclockwise. The fluid in the eddy, contiguous to the main stream, flows in the same direction as the main stream and this fluid is accelerated in a downstream direction, due to momentum interchange. Thus the eddy V aids in preventing pressure feedback and reverse flow through the boundary layer into the "sealed" boundary layer region.

While the above description is for the flow switched to aperture 18*a* by flow from nozzle 16 and obstruction of discharge from channel 18 by any member, performance is similar if flow is switched to aperture 17*a* by flow from nozzle 32 and partial or complete obstruction of discharge from channel 17 exists.

FIG. 7 illustrates schematically how system 10*b* can be utilized to operate a conventional pneumatic hammer 200. Pressurized air is supplied to system 10*b* through hose 201. Hose 202 is connected to hose 201 and communicates with spool valve 204. Valve 203 regulates flow of air through hose 201.

Hammer 200 comprises a cylinder 205, a piston 206 axially movable therein and a piston rod 218*a*. Coil spring 207 abuts cylinder head 208 and piston 206 and urges piston 206 into contact with opposite cylinder head 209. Hose 247 communicates with spool valve 204 and with the control nozzle 232. Hose 226 connects control nozzle 216 with a port 211 formed in the wall of cylinder 205, while hose 227 connects aperture 217 with cylinder 205 through port 213. Port 211 is spaced from cylinder head 208 a distance slightly greater than the length of piston 206 so that it is uncovered when piston 206 abuts cylinder head 208. It should be evident that the hose ends can be threadedly secured into any desired opening.

Piston rod 218*a* is formed with an annular groove 219 which cooperates with valve 204 and with the open ends of hoses 202 and 247 so that valve 204 permits flow from hose 202 to hose 247 only while piston 206 is at the return end of its stroke, that is, when piston 206 abuts cylinder head 209. In other positions of piston 206, rod 218*a* will block flow between hose 202 and hose 247. When piston 206 abuts cylinder head 209, air will flow from hose 202 into control nozzle 232 because groove 219 will allow hose 202 to communicate with hose 247. Control nozzle 232 will cause the main jet issuing from supply nozzle 215 to enter aperture 217. As a result, hose 227 will supply air pressure into cylinder 205 between cylinder head 209 and piston 206. This air so supplied will drive piston 206 against spring 207 until piston 206 closely approaches cylinder head 208.

Even though the pressure in cylinder 205 increases between piston 206 and cylinder head 209, and accordingly in aperture 217, the main jet from supply nozzle 215 remembers that it was last commanded to flow into aperture 217 and therefore persists in supplying air to this aperture. And this is true even though rod 218*a* blocks air flow into hose 247.

When piston 206 approaches cylinder head 208, port 211 will receive the effect of the high air pressure in cylinder 205. A fluid jet or pulse will be received by hose 226 which will cause control nozzle 216 to issue a jet and switch the supply jet from aperture 217 into aperture 218. Aperture 218 vents to the atmosphere and this air is therefore exhausted from system 10*c*. Since air is no longer supplied to cylinder 205 spring 207 can drive piston 206 against cylinder head 209 until groove 219 is opposite the open ends of hoses 202 and 247. The described cycle will then repeat itself until valve 203 is closed.

Although fluid multistable memory system 10b is shown as actuating a pneumatic hammer in FIG. 7, it will be apparent to those skilled in the art that this system can also be used in other and sundry applications where the properties and effects of the system find utility or need.

Also, while system 10b is shown as having a pair of opposite control nozzles a single control nozzle can be also used. The memory property of the system does not change as a result of increasing or decreasing the number of control nozzles.

A particular unit can be so constructed that whenever the power jet is initiated, it always issues from the same outlet passage in the absence of control signals. This phenomena may be employed to cause the power jet to issue from a particular outlet if, during operation of the unit, the power jet has become deflected to another outlet passage or its position is unknown. This type of operation is known as "reset." There are several features of the unit which individually or severally can be so constructed that the unit will reset upon termination and reinitiation of power stream flow. The divider can be located asymmetrically with respect to the power nozzle centerline. The power jet orifice can be inclined or located in such a manner that the power jet stream is directed toward or located closer to one boundary wall than the other. The edge of the power nozzle exit can be rounded in the direction in which it is desired to incline the stream. The side wall divergence angles can be different to provide asymmetry.

A unit having a reset characteristic is illustrated in FIGURE 8 of the accompanying drawings. In this unit, there is provided a power nozzle 251 and a divider 252 having its apex located along the centerline *c—c* of the apparatus. A left side wall 253 has its lower end in line with the left side of the power nozzle 251 and forms a predetermined angle Beta with the centerline *c—c*. A right side wall 254 has a set back of about three widths of the power nozzle and is set at a larger angle Beta, with respect to the centerline *c—c*, than the side wall 253. Control nozzles 256 and 257 extend through side walls 253 and 254, respectively.

In this unit, due to the fact that the power stream is closer to the side wall 253 at its point of issuance, no setback, and throughout its travel toward the divider 252, a smaller angle B than wall 254, the stream, in the absence of a control signal, is more effective in reducing the pressure in the left side of the interaction chamber than in the right side thereof. Consquently, whenever power fluid flow is initiated, the power stream locks onto the left side wall 253 in the absence of a control signal. Control signals are effective in the same manner as in a symmetrical unit except that a larger signal must be applied to control nozzle 256 than to control nozzle 257, to effect switching.

The device of FIGURE 8 may be employed as a comparator as is the case with the units of FIGURE 2. In such a unit, control streams are flowing to both boundary regions and the power stream issues from the outlet opposite to the largest control stream flow. In the case of symmetrical units, a hysteresis exists such that the control signal differential must exceed a minimum amplitude to cause switching. By means of the reset effect, the comparison can be made to be other than on an equal basis; for instance, switching toward the left wall 253 can be made to occur whenever a signal differential exists, rather than when the signal differential exceeds a specific value.

An interaction chamber side wall need not be a plane as shown in FIGURES 2, 3, 5, 6, 7 and 8, but can be a curved surface as illustrated in FIGURES 1 and 4, or a series of plane surfaces at different angles reltaive to the nozzle centerline. Use of such surfaces permits turning flow through large angles. For example, consider flow which has locked onto an inclined sidewall and is flowing parallel to this side wall downstream of the attachment location. The ability to cause the power stream to follow an additional turning angle of the side wall downstream of the point of attachment, as in units of the type illustrated in FIGURE 3, is governed by the same type of flow parameters as govern initial lock-on. Each turn is in effect an additional amplifier and can be provided with its own control orifices to determine whether the flow locks on or detaches or operates at some in between flow configuration at the region of this new side wall slope.

While the units have been depicted for purposes of clarity as being contained within a rectilinear volume there are numerous axes about which surfaces of revolution can be described, with the contours of FIGURES 1, 2, and 6 to define units which will cause a fluid stream to function as herein indicated.

One such axis is centerline *c—c* in FIGURES 1, 2, and 6 wherein the control passages 16 and 32 could be replaced by multiple control orifices. Another axis can be located parallel to centerline *c—c*, and at distance from it, about which surfaces of revolution can be described by the contours of FIGURES 1, 2, and 6 lying between the centerline *c—c* and the axis of revolution. These units function as the basic units described above.

Other axes about which surfaces of revolution can be described by the contours of FIGURES 1, 2, and 6 can be located perpendicular to centerline *c—c* and located above the output passages or below the power nozzle. These configurations are noted for convenience in construction and location of inputs and outputs and do not effect the basic operation of the device described.

Summarizing the principles of the present invention, the energy of fluid stream is utilized in a unique system which has no moving parts. The system utilizes the principle of boundary layer control so that fluid under pressure performs a definite multistable switching action between output apertures. In addition to providing a multistable switching operation, the function of multiplication and amplification can also be performed by the fluid stream. The functions can be performed on a continuously variable basis so that the multistable switching action, or directing of the main fluid stream provides a continuously variable output in response to a continuously varied control signal and can be stable at any switching position between the extreme values provided by the particular amplifier model. In addition, a pure fluid amplifier of the type with which the present invention is concerned, can be constructed with a configuration wherein the output is delivered to one of two receiving apertures during operation until a command signal is applied whereupon the output is delivered to the second of the two receiving apertures in preference to the first of the two receiving apertures even after the command or control signal has been discontinued. Similarly an appropriate command signal can subsequently be applied to cause a switching action wherein the output is again delivered to the first of the two receiving apertures in preference to the second of these two receiving apertures.

According to this invention, a fluid-operated system is provided which stabilizes the fluid stream in two or more positions in the system. In addition, the system of this invention has a memory characteristic. As has been previously defined the term "memory" refers to the tendancy of the fluid stream to persist in trying to exhaust into the directed aperture.

Both flat and curved surfaces have been used in both internal and external fluid flow devices for many years. This invention makes use of the flow characteristics associated with such surfaces cooperatively with control of pressure distribution within the resulting boundary region or boundary layer through use of control fluid flow and cooperatively with a target area appropriately divided into suitably shaped receiving apertures and cooperatively with a power stream to provide delivery of the power stream to the receiving apertures in a fashion or manner dependent upon the existing control signal combination or the previous control signal combination applied. In this fashion an output signal is provided which is an amplified function of a control signal or combination of control signals. This output signal; i.e., combination of output channel pressures, or mass flow rates, or power levels can be either continuously variable or digital in its relationship with the control signals, as desired, by suitably configuring the amplifier interaction region sidewalls. Accordingly, the output signal can be a function of the control signals which provides operation conventionally referred to as logic or operation, conventionally referred to as a mathematical type operation.

It will be apparent that the embodiments shown are only exemplary and that various modifications can be made in construction and arrangement within the scope of the invention as defined in the appended claims.

What is claimed is:

1. A pure fluid system, comprising:
a walled chamber,
a nozzle for issuing a jet of fluid into said chamber along a wall of said chamber,
a receiving channel upstream of said wall and positioned to receive said jet,
said receiving channel having channel walls containing a sufficiently abrupt change of slope to form a vortex in response to said jet during closure of said channel operative to prevent transfer of said jet out of said channel in response to closure of said channel.

2. The combination according to claim 1 wherein said wall is configured and positioned to enforce boundary layer lock-on of said jet to said wall.

3. A pure fluid system, comprising
a walled chamber,
a nozzle for issuing a deflectable jet of fluid into said chamber along a wall of said chamber,
a receiving channel means positioned to receive said jet, the distance between said nozzle and the entrance to said receiving channel means being sufficiently great and said channel being so shaped that said jet remains directed toward said channel despite backloading of said channel.

4. A multi-stable fluid-operated system for providing memory and multi-stable switching in a fluid stream, comprising:
a chamber,
a supply aperture at one end of said chamber adapted to issue a stream of fluid into one end of said chamber,
receiving channels having walls and communicating with the other end of said chamber for receiving fluid from said chamber,
chamber walls forming said chamber,
said chamber walls extending to the walls of said receiving apertures so as to form a wall surface therebetween,
means comprising the walls forming said receiving channels and said chamber walls having configurations arranged and adapted to provide boundary layer lock on with memory,
control means adapted to issue fluid into said chamber between said stream of fluid from said supply aperture and said chamber walls,
means for causing variable flow through saaid control means in response to some variable condition, and
means associated with at least one of said receiving channels adapted to operate in response to fluid flow thereto.

5. A fluid-operated system for providing memory and switching of a fluid stream, comprising:
walls forming a chamber,
receiving channels communicating with one end of said chamber,
means operative in response to fluid flow in at least one of said receiving channels,
a supply aperture opening into said chamber for supplying a fluid stream into the other end of said chamber for transfer to said receiving channels via said chamber,
said walls being set back a predetermined distance from said supply aperture and joining said receiving channels to said supply aperture so as to form boundary layer control wall surfaces therebetween,
a portion of the walls of said receiving channels having abrupt changes of slope and the entrances to said receiving channels being downstream in terms of supply aperture width sufficiently that said receiving channels are arranged and adapted to provide memory, and
control means supplying signal to said chamber to deflect said jet.

6. A fluid-operated system for providing memory in a fluid stream, comprising:
a chamber formed by a diverging pair of walls,
a supply aperture for issuing a main stream of fluid into one end of said chamber,
receiving channels having walls constituting extensions of said pair of walls and communicating with the other end of said chamber opposite said one end and adapted to receive fluid from said chamber,
a transition wall joining said diverging walls and said walls of said channels and having a sufficiently abrupt change of slope that a fluid vortex is created,
control means interposed between said supply aperture and said receiving apertures,
said control means issuing fluid pressure signal through one of said walls of said diverging pair of walls into said chamber,
means for controlling the fluid pressure signal issued by said control means in response to a predetermined condition, and
means associated with at least one of said receiving channels adapted to operate in response to fluid flow to said at least one of said receiving channels.

7. A fluid-operated system for providing memory and multistable switching of a fluid stream, comprising:
a chamber having chamber walls,
an orifice at one end of said chamber having an opening for issuing a stream of fluid into said chamber,
receiving channels for said stream of fluid having further walls,
said further walls having a sufficiently abrupt change of slope that a fluid vortex is created,
means associated with each receiving channel and actuated by fluid flowing into said receiving channels,
said chamber walls being set back from said opening of said orifice by distances selected to achieve boundary layer lock-on of said stream of fluid,
control means adapted to issue fluid pressure signal into said chamber between said stream of fluid from said supply aperture and said diverging walls to deflect said fluid stream selectively to said channels, and
wall means for maintaining the deflected stream in a single plane only.

8. A fluid-operated system, comprising:
a supply orifice adapted to issue a deflectable stream of fluid through an interaction region,
a receiving orifice for said stream of fluid communicating with said interaction region,
means for deflecting said stream of fluid in said interaction region to modulate flow of said stream of fluid to said receiving orifice, and
fluid vortex forming means connected to said receiving orifice.

9. A fluid-operated system for providing memory and stable switching of a deflectable fluid stream, comprising:
a surface capable of supporting fluid flow therealong,
means issuing a deflectable stream of fluid, said surface being so configured and located with respect to said stream when undeflected that said stream locks-on at a first location of said surface when deflected toward said surface, said surface having an abrupt change of slope located downstream of said first location, said abrupt change of slope being configured to generate a vortex.

10. A fluid-operated system for providing memory and multistable switching of a fluid stream, comprising:

means issuing a deflectable stream of fluid, a surface so conformed and located with respect to said stream when undeflected that said stream locks on said surface when issued, a portion of said surface having an abrupt change of slope so conformed that a fluid vortex is created by said stream when deflected, control means for issuing fluid to deflect said stream away from said surface, means responsive to a variable condition for actuating said control means, an aperture for receiving said stream of fluid, said aperture being located upstream of said abrupt change of slope, and load means responsive to flow of said stream of fluid to said aperture.

11. A fluid-operated system for providing memory and multistable switching to a fluid stream, comprising: a surface capable of supporting fluid flow thereupon, means issuing a stream of fluid, said surface diverging from said stream so issued such that said stream locks-on said surface, a portion of said surface having an abrupt change of slope so that a fluid vortex is created therein, control means for issuing fluid between said stream of fluid and said surface, said control means being positioned between said means issuing a stream of fluid and said portion, apertures for receiving flow from said stream of fluid, and means actuated as a result of flow to said apertures.

12. A fluidic system comprising:

surface means capable of supporting fluid flow thereupon, means issuing a deflectable stream of fluid, said surface means being so located and configured with respect to said stream that said stream locks on said surface, a portion of said surface means having an abrupt change of slope so conformed that a fluid vortex is created therein by said stream of fluid.

13. A fluid operated system for attaining multistaple switching comprising:

a walled chamber, an aperture at one end of said chamber for issuing a deflectable main stream of fluid into said walled chamber, receiving channels communicating with the end of said chamber opposite said one end for receiving fluid from said walled chamber, the walls of said chamber being conformed and dimensioned and located so that said main stream stably locks by virtue of boundary layer lock-on to one of said walls, and control means for resetting said main stream to the other of said walls.

14. The system according to claim 13 wherein the downstream distance from said aperture to said receiving channels is sufficiently small that predetermined fluid pressure increase in a receiving channel to which said deflectable main stream of fluid is directed effects transfer of said deflectable main stream to the other of said receiving channels.

15. The system according to claim 14, wherein the downstream distance from said aperture to said receiving channels is sufficiently great that predetermined fluid pressure increase in a receiving channel to which said deflectable main stream of fluid is directed cannot effect transfer of said main stream of fluid to the other of said receiving channels.

16. A fluid operated system for attaining a switching effect comprising:

a chamber formed with at least one chamber wall, receiving channels communicating with one end of said chamber, a supply aperture opening into said chamber directing a deflectable main fluid stream into the other end of said chamber and toward said receiving channels, said chamber wall being conformed and positioned so that said main fluid stream when sufficiently deflected forms a stable boundary layer attachment to said chamber wall only downstream of and spaced from said supply aperture opening, control means for deflecting said deflectable main fluid stream located between said chamber wall and said fluid stream and upstream of said attachment of said main fluid stream to said chamber wall, and means responsive to a variable condition for controlling said control means.

17. The invention as claimed in claim 16, wherein said chamber wall diverges to join with a wall of a receiving channel.

18. The invention as claimed in claim 17, wherein said supply aperture, said chamber wall, and said receiving apertures are axially symmetrical with respect to said supply aperture.

19. The invention as claimed in claim 17, wherein said receiving apertures are asymmetrical with respect to said supply aperture.

20. A fluid operated system for attaining multistable switching comprising:

a chamber, a supply orifice at one end of said chamber adapted to issue a deflectable main stream of fluid into said chamber, receiving apertures located at the other end of said chamber for receiving fluid from said chamber, said chamber comprising walls extending from said one end of said chamber, said pair of walls having configurations including setbacks at said orifice arranged and adapted to provide boundary layer lock on of said main stream of fluid to one of said walls, control means located at a location along at least one of said pair of walls, means for controlling signal through said control means, and means associated with at least one of said receiving apertures responsive to fluid pressure therein.

21. The system according to claim 20, wherein said control means comprises plural orifices for supplying fluid flow in response to an associated set of conditions, respectively.

22. The system according to claim 21, wherein said plural orifices are located on the same side of said main stream of fluid.

23. The invention as claimed in claim 21, wherein said means for causing variable flow through said control means consists of means associated with each of said multiple orifices for causing variable control fluid flow through each of said multiple orifices in response to an associated variable condition.

24. A fluid operated system exhibiting boundary layer effects, comprising:

means for issuing a laterally deflectable stream of fluid into an interaction region, said interaction region including a sidewall so laterally located relative to the undeflected stream of fluid and so configured that the stream of fluid may deflect as a whole through an angle of deflection substantially common to the entire stream and only when so deflected may approach said side wall upstream of a boundary layer control region of said side wall, and means for laterally deflecting the stream of fluid with respect to said side wall, said means for laterally deflecting being arranged to selectively vary the pressure distribution between said boundary layer region and the remainder of the interaction region.

25. The combination according to claim 24, wherein said means for laterally deflecting comprises at least one control aperture communicating with said interaction region.

26. The combination according to claim 24, wherein is provided a divider, said divider providing at least one wall of an outlet passage.

27. The combination according to claim 26, wherein said outlet passage includes two walls and said divider provides one wall of said outlet passage and said sidewall provides another wall of said outlet passage.

28. The combination according to claim 27, wherein said divider includes an apex located as far downstream of said means for issuing as is located substantially at the downstream edge of said boundary layer control region.

29. The combination according to claim 27, wherein said apex is located substantially downstream of the downstream edge of said boundary layer control region.

30. The combination according to claim 26, further comprising a second sidewall, said second sidewall and said divider providing a second outlet passage.

31. The combination according to claim 30, wherein said divider is located symmetrically of said sidewalls.

32. The combination according to claim 30, wherein said divider is located asymmertically of said sidewalls.

33. The combination according to claim 30, wherein said means for issuing a stream of fluid comprises a power nozzle.

34. The combination according to claim 33, wherein said sidewalls have lateral setbacks from said power nozzle.

35. The combination according to claim 34, wherein said setbacks are asymmetrical.

36. The combination according to claim 33, wherein said sidewalls adjacent said power nozzle form different angles with respect to the centerline of said power nozzle.

37. The combination according to claim 30, wherein said sidewalls and divider are arranged so that said fluid stream proceeds to one of said outlet apertures in absence of any control signal.

38. The combination according to claim 37, wherein said sidewalls are laterally set back from the boundaries of said power nozzle sufficiently and are so shaped as to enable achievement of said angle of deflection.

39. The combination according to claim 38, wherein said sidewalls adjacent said power nozzle diverge at different angles with respect to the centerline of said power nozzle.

40. The combination according tn claim 25, wherein is provided means for applying bias pressure to said at least one control aperture selected to direct said fluid stream to a selected one of said outlet passages in absence of a control signal.

41. The combination according to claim 24, wherein said means for laterally deflecting is responsive to at least partial backloading of said one of said outlet passages for transferring said stream of fluid from said outlet passage.

42. The combination according to claim 24, wherein said means for laterally deflecting comprises at least two control apertures each communicating with said interaction region adjacent a different one of said sidewalls.

43. The combination according to claim 24, wherein said means for laterally deflecting comprises at least two control apertures each communicating with said interaction region at the same one of said sidewalls.

44. The combination according to claim 42, wherein is provided means for applying bias flow to at least one of said control apertures.

45. The combination according to claim 42, further comprising means for applying two fluid flows to be compared to different ones of said control apertures, and means for determining the proportions of said fluid directed to said outlet passages in response to said two fluid flows.

46. The combination according to claim 24, further comprising a mechanically movable utilization device responsive to said stream of fluid.

47. The combination according to claim 24, wherein said means for laterally deflecting comprises a plurality of control apertures and means for independently controlling fluid flow through separate ones of said plurality of control apertures.

48. The combination according to claim 24, wherein said means for laterally deflecting comprises means defining at least one control region disposed on one side of said stream of fluid and means for varying fluid pressure in said control region relative to the fluid pressure on the other side of said stream fluid.

49. A fluidic amplifier, including an interaction chamber, a nozzle for issuing a jet deflectable through a substantial angle in said interaction chamber without substantial jet deformation, fluid reception channel means for said jet extending from said interaction chamber downstream of said nozzle, at least one side wall having a contour in an area extending from said nozzle toward said fluid reception channel means arranged and adapted to provide a substantial deflecting effect on said jet consequent on fluid entrainment by said jet due to flow of said jet with respect to said side wall, said contour being shaped and said at least one side wall being located so as to permit deflection of said jet of fluid adjacent said nozzle through said angle without said substantial jet deformation.

50. The combination according to claim 49 wherein said fluid reception channel means comprises at least two fluid reception channels.

51. The combination according to claim 50, wherein said fluid reception channels are positioned so that one of said channels receives substantially no jet when said jet is directed wholly toward another of said reception.

52. The combination according to claim 49, wherein said contour includes an offset which extends approximately perpendicularly of the centerline of said nozzle substantially at said nozzle.

53. The combination according to claim 49, wherein is provided means for modifying fluid pressure distributions adjacent said jet to deflect said jet.

54. The combination according to claim 53, wherein said means for modifying fluid pressure includes at least two control nozzles both located on the same side of said jet.

55. The combination according to claim 53, wherein said means for modifying includes means for backloading of said fluid reception channel means.

56. The combination according to claim 53, wherein said means for modifying includes a means for providing at least one control stream of fluid in momentum interchange relation to said jet.

57. The combination according to claim 53, wherein said means for modifying includes means for inducing a change in said fluid entrainment by modifying fluid conditions in the region between said side wall and said jet of fluid.

58. The combination according to claim 56, wherein at least one of said control stream and said jet is a mixture of fluids of diverse fluid characteristics.

59. The combination according to claim 53, wherein said jet is a mixture of liquid and gas.

60. The combination according to claim 53, wherein said contour is arranged so that said jet normally proceeds undeflected absent said means for modifying fluid pressure.

61. The combination according to claim 56, wherein is provided a second means for modifying which includes means for issuing a second control stream of fluid in opposition to said first mentioned control stream of fluid.

62. The combination according to claim 49, wherein said fluid amplifier, including said nozzle, said downstream reception channels and said at least one side wall, is formed of a unitary block of solid material.

63. The combination according to claim 53, wherein said contour is arranged and adapted to provide analog operation of said amplifier with boundary layer gain modification.

64. The combination according to claim 53, wherein said contour is arranged and adapted to provide digital operation of said amplifier.

65. The combination according to claim 56, wherein said control stream of fluid and said jet are diverse fluids, respectively.

66. The combination according to claim 56, wherein one of said control streams of fluid and said jet is gaseous and other is liquid.

67. A fluid amplifier system according to claim 48 wherein is provided a second side wall having a contour in an area extending from said nozzle toward the other of said reception channels, which is arranged and adapted to provide a substantial deflecting effect on said jet consequent on fluid entrainment of said jet due to flow of said stream of fluid adjacent to said second side wall, said last named contour being shaped to permit deflection of said jet of fluid adjacent said nozzle through a substantial angle without substantial jet deformation.

68. The combination according to claim 67, wherein is provided a generally wedge shaped divider member having its smaller end facing said nozzle, said divider member and said side walls providing said fluid reception channels.

69. The combination according to claim 68, wherein the distance of said smaller end of said generally wedge shaped divider member downstream of said nozzle is so selected that blockage of a reception channel into which stream of fluid is proceeding does not transfer said jet to another of said reception channels.

70. The combination according to claim 68, wherein the distance of said smaller end of said wedge shaped divider member downstream of said nozzle and the character of said contour are so selected that said amplifier operates digitally.

71. The combination according to claim 49, wherein is provided a further fluidic amplifier system responsive to fluid flow in said fluid reception channel means.

72. The combination according to claim 71, wherein said further fluidic amplifier includes a further nozzle for issuing a further jet deflectable through a substantial angle, and wherein said at least one of said fluid reception channels is connected to supply fluid to said further nozzle.

73. The combination according to claim 71, wherein said further fluidic amplifier includes at least one means for providing a control stream of fluid, and wherein said at least one of said fluid reception channels is connected to supply fluid to said last named means.

74. The combination according to claim 49, wherein is provided a second side wall having a contour in an area extending from said nozzle toward the other of said reception channel, said second side wall being sufficiently spaced laterally of a line joining said nozzle to said other of said reception channel that no deflecting effect can occur consequent of fluid entrainment by said jet due to flow of said jet with respect to said second side wall.

75. The combination according to claim 49, wherein is further provided means responsive to presence of an opening in a tape for deflecting said jet with respect to said channel means.

76. The combination according to claim 56 wherein said means for modifying is a further fluidic amplifier having an output passage for providing said control stream of fluid.

77. The combination according to claim 56, wherein is provided means for eliminating said control stream of fluid in response to sensing of an event, whereby in response to said event said control stream of fluid is no longer issued in momentum interchange relation to said jet of fluid.

78. The combination according to claim 52, wherein is provided a vortex forming cusp in said at least one side wall located at a point within one of said reception channels.

79. The combnation according to claim 52, wherein is provided a vortex forming sharp lateral offset in said one of said side walls located at a point within said one of said reception channels.

80. The combination according to claim 53, wherein is further provided means including a structural discontinuity in one of said side walls located at a point within one of said reception channels operative to modify flow of said fluid stream caused by at least a partial backloading of said one of said channels sufficiently that said fluid stream remains directed into said one of said reception channels despite said at least a partial backloading.

81. The combination according to claim 80, wherein said backloading is a complete blockage of said one of said reception channels.

82. The combination according to claim 68, wherein said nozzle, said side walls and said downstream reception channels, are formed in a block of solid material, and a cover plate for said block of solid material.

83. The combination according to claim 49, wherein said fluidic amplifier system, inclding said nozzle, said interaction chamber and said fluid reception means are formed of a unitary block of solid material and a cover plate for said block of solid material.

84. The combination according to claim 49, wherein is provided spaced parallel walls constraining said jet of fluid to remain always in a single plane.

85. The combination according to claim 67, wherein is provided spaced parallel walls constraining said jet of fluid to remain always in a single plane.

86. The combination according to claim 67, wherein the spacing of said side walls relative to the width of said channel is selected such that said jet is subject to equal deflecting effects with respect to both said side walls due to flow of said jet adjacent to both said side walls.

87. The combination according to claim 67, wherein said side walls are parallel throughout at least a portion of their lengths.

88. The combination according to claim 67, wherein said contours are so shaped and said side walls so located and said divider member so located that said jet of fluid is stable at least while undeflected.

89. The combination according to claim 67, wherein said contours are so shaped and said side walls so located and said divider so located that said jet of fluid is unstably disposed toward one of two stable deflections.

90. The combination according to claim 67, wherein said divider is asymmetrical with respect to said nozzle.

91. The combination according to claim 67, wherein said side walls are asymmetrical with respect to said nozzle.

92. The combination according to claim 67, wherein is provided lateral offsets of said side walls at said nozzle.

93. The combination according to claim 92, wherein said offsets are asymmetrical.

94. In a fluid amplifier system, an interaction chamber, a nozzle for issuing a deflectable jet of fluid through said interaction chamber, at least two reception channels having entrances from said interaction chamber and located to receive said jet selectively according to the direction of flow of said jet, bias means for applying bias normally constraining said jet to flow toward a first of said reception channels,
said jet of fluid being normally directed toward a second of said reception channels, and
means responsive to occurrence of an event for reducing said bias sufficiently to transfer said jet of fluid from said first of said reception channels to said second of said reception channels.

95. A fluid amplifier system, including
an interaction chamber,
a pair of reception channels having entrances opening on said interaction chamber,
a nozzle for issuing a directible jet of fluid through said interaction chamber toward said entrances,
said entrances being positioned to receive said jet of fluid selectively according to the directivity of said jet of fluid,
bias means normally providing bias causing said jet of fluid to flow toward one of said entrances to the substantial exclusion of the other of said entrances,
said jet of fluid normally flowing toward said other of said entrances, and
control means for overcoming said bias.

96. A fluidic system, comprising
a fluidic amplifier flip-flop having two states,
a mechanical operating member operable in response to said fluidic amplifier flip-flop in only one of its states,
at least one control channel obstructible at will, and
means maintaining said fluidic amplifier flip-flop in said one of its states in response only to obstruction of said control channel.

97. A monostable fluidic amplifier system, including
an interaction chamber,
reception channels arranged substantially in a single plane and having entrances opening into said interaction chamber,
at least one nozzle,
means including said at least one nozzle for issuing a jet of fluid normally and stably into only one of said entrances, and
fluid control means operative to direct said jet of fluid into the other of said entrances only while said fluid control means is operative.

98. In combination,
a member movable between a first and a second position,
a bistable fluidic amplifier having a first channel to which fluid is directed in one of the stable states of said fluidic amplifier, and having a second channel to which said fluid is directed in the other of said stable states,
means responsive to fluid flow only in said first channel for impelling said member from its first to its second position, and
means responsive to attainment by said member of said second position for transferring the state of said bistable fluidic amplifier to said second of said stable states.

99. The combination according to claim 98 wherein is further provided
means for moving said member from its second to its first position, and
means responsive to attainment by said member of said first position for re-transferring the state of said bistable fluidic amplifier to said first of said stable states.

100. The combination according to claim 99, wherein said member is a piston, a cylinder, said piston being impellable within said cylinder from between said first and second positions, and ports in said cylinder communicating with said channels.

101. In a protective system for an operator,
an operative member biased toward a first location and movable from said first location to a second location,
a fluid amplifier having two states and normally in one of said states,
means responsive to said fluid amplifier in the other of said states only for transferring said member from said first location to said second location,
fluid control port means, and
means responsive only to total blockage of said fluid control part means by said operator for transferring said fluid amplifier from said one of said states to said other of said states.

102. The system according to claim 101, wherein said fluid control port means is two ports separated sufficiently that two members of said operator are required to block said two ports simultaneously.

103. The combination according to claim 102,
a press,
said member being connected in operating relation to said press.

104. The combination according to claim 102,
a punch,
said member being connected in operating relation to said punch.

105. In a protective system for an operator of a press,
fluid amplifier means for operating said press,
two ports closable each only by a different one of the hands of said operator, and
means operative only on blockage of both said ports for operating said press.

106. A multistable fluid amplifier configuration, comprising
first and second fluid channels having entrances at an interaction region,
a nozzle for issuing a directible jet of fluid through said interaction region selectively to said entrances,
a divider having two separated surface and a downstream apex,
a first side wall,
a second side wall,
said first fluid channel being comprised of one surface of said divider and one of said walls,
said second channel being comprised of the other surface of said divider and the other of said walls, said walls having lock on regions,
said walls and surfaces having configurations and said walls having discontinuities upstream of said lock on regions arranged and adapted to maintain an established directivity of said jet in said channels while said channels are backloaded by modifying the flow pattern of said jet in said channels responsive to the backloading of said channels with respect to the patterns which exist absent such backloading.

107. The combination according to claim 106, wherein said channels are substantially wider upstream of said discontinuities than downstream of said discontinuities.

108. The combination according to claim 107, wherein said apex is located approximately at least 11 nozzle widths downstream of said nozzle.

109. The combination according to claim 107, wherein said directivities include selectively those in which the directive jet is locked to one of said surfaces and those in which the jet is locked to one of said walls upstream of the discontinuity associated with said one of said walls.

110. A planar fluid system, comprising
a main channel issuing a planarly deflectable main stream into a planar interaction region,
at least two stream receiving channels located only in a common plane and leading from said interaction region in stream receiving relation to said main stream,
each of said receiving channels having a cross sectional area at least substantially as great as the cross sectional area of said main stream, as said main stream issues from said main channel, wherein said interaction region is bounded by walls having a configuration arranged to complete transfer of said main stream totally into one of said receiving channels to the exclusion of the other only in response to a predetermined incremental initial deflection of said main stream.

111. The combination according to claim 110, wherein the other of said reception channels is so located as to receive said main stream only while said main stream is undeflected.

112. The combination according to claim 110, wherein said configuration is arranged to maintain said main stream deflected into either one of said receiving channels to which it is directed to the exclusion of the other.

113. The combination according to claim 111, wherein said configuration is arranged to effect automatic reset of said main stream to the other of said reception channels following said deflection.

114. A fluidic gate, comprising
a closed interaction chamber having a wall, a main channel issuing a main stream of fluid through said interaction chamber,
a receiving channel for said main stream of fluid,
means for directing a control stream through said wall into intersecting relation to said main stream,
said main stream being directed to said receiving channel only in absence of said control stream,
said chamber including a further port for receiving said main stream when subject to said control stream,
said wall being positioned and configured to control the path of said main stream only when said main stream is undeflected, and
wherein said control stream is arranged to separate said main stream from said wall when said main stream is subject to said control stream, and
wherein a block of solid material incorporates said closed chamber, said wall, said main channel, said control channel, and said further port.

115. The combination according to claim 114, wherein is provided a further fluidic gate in cascade with the first mentioned fluidic gate.

116. The combination according to claim 114, wherein is provided a further fluidic gate having further means issuing a further main stream of fluid, and
wherein the first mentioned stream of fluid provides said further stream of fluid.

117. The combination according to claim 114, wherein is provided a further fluidic gate having further means for directing a further control stream, and
wherein the first mentioned stream of fluid provides said further control stream.

118. A fluidic system, comprising
a fluidic amplifier flip-flop having two output passages, representing two states,
a load connected to at least one of said output passages,
at least one controllably obstructible control port, and
means maintaining said fluidic amplifier flip-flop in one of its two states in response only to obstruction of said at least one control port.

119. The combination according to claim 118, wherein said at least one control port is at least two control ports, and wherein said last named means is operative only in response to simultaneous obstruction of said at least two control ports.

120. The combination according to claim 118, wherein said at least one control port is three control ports, and wherein said last named means is operative only in response to simultaneous obstruction of said at least three control ports.

121. The combination according to claim 118, wherein said load is a press.

122. The combination according to claim 118, wherein said load is an expansible chamber device.

123. The combination according to claim 119, wherein said two control ports are spaced sufficiently to require obstruction each by a different member of the human body.

124. The combination according to claim 118, wherein is provided a fluid tape sensor means, said fluid tape sensor means including said at least one control port.

125. The combination according to claim 124, wherein said load is a punch.

126. A logic system, comprising
a first monostable fluidic gate,
a source of a first stream of fluid supplied to said first fluidic gate for gating thereby in response to fluid gating signal,
a source of said gating signal,
a second monostable fluidic gate connected in cascade with said first fluidic gate,
a source of a further stream of fluid supplied to said further fluidic gate for gating thereby in response to a second fluid gating signal, and
means for deriving said further stream of fluid from said source of a first stream of fluid.

127. A logic system, comprising
a first monostable gate,
a source of a first stream of fluid supplied to said first fluid gate for gating thereby in response to fluid gating signal,
a source of said gating signal,
a second monostable fluidic gate having a gating port, and
means for deriving fluid from said first stream of fluid and applying the derived fluid to said gating port.

128. A gating system, comprising
a first monostable gate comprising a first nozzle issuing a first main jet across a first interaction region to a first reception channel,
gating means for issuing a first control jet in intercepting relation to said main jet and comprising a first control channel,
a second monostable fluid gate, comprising a second nozzle issuing a second main jet across a second interaction region to a second reception channel,
second gating means for issuing a second control jet in interacting relation to said second main jet and comprising a second control channel, and
means connecting said first reception channel to said second control channel to provide said second control jet.

129. A gating system, comprising
a first fluidic gate comprising a first nozzle issuing a first main jet across a first interaction region to a first reception channel,
gating means for issuing a first control jet in intercepting relation to said main jet and comprising a first control channel,
a second fluidic gate, comprising a second nozzle issuing a second main jet across a second interaction region to a second reception channel,
second gating meas for issuing a second control jet in interacting relation to said second main jet and comprising a second control channel, and
means connecting said first reception channel to said second nozzle to provide said second main jet.

130. A system for detecting a hiatus in a sheet, comprising
a support including at least one aperture,
said aperture being disposed adjacent said sheet,
a fluid amplifier having an input channel,
first and second output channels,
a source of power fluid connected to said input channel normally directing a power stream through said first output channel,
means connected between said aperture and said fluid amplifier responsive to said sheet only while the material of said sheet and not said hiatus in said sheet is covering said aperture to switch said power stream from said first to said second output channel.

131. An object sensing mechanism, comprising in combination:
means including a surface for supporting and guiding said object,
said surface having an aperture disposed in the path of travel of said object,
a fluid amplifier having an input channel,
first and second output channels,
a first source of fluid connected to said input channel normally directing a power stream through said first output channel,
a control channel connected to said fluid amplifier adjacet said first output channel,
a second source of fluid,
conduit means communicating with said control channel and connected between said aperture and said second source of fluid providing a fluid signal in said control channel to switch said power stream from said first to said second output channels when said object covers said aperture.

132. In combination,
a first fluidic device having at least one stable state,
a second fluidic device having at least one stable state,
a fluidically operated output device,
means interconnectig said fluidic devices in an AND gate configuration with respect to said output device, and
separate fluidic signal inputs to said first and second fluidic devices.

133. A fluidic control system, including
a first fluidic device having a nozzle,
means applying fluid to said nozzle for issuance therefrom,
output port means and control signal input port means, and
second fluidic means for modulating said fluid applied to said nozzle,
said first fluidic device being arranged and adapted to have at least one stable state.

134. A fluidic device, including
a main channel for issuing a well defined stream of said fluid in a first direction, such stream of fluid being deflectable in alternate senses with respect to the undeflected stream,
separate control channels for applying separate fluid control streams to opposite sides of said well defined stream of said fluid, respectively, to modulate said stream,
two walls located on opposite sides of said well defined stream, said two walls being so located and shaped that stream interaction of said stream with said walls occurs when said stream is modulated, said control channels extending through said two walls,
at least two discrete ports located on opposite sides of said center line for issuance of said stream when modulated,
at least one third wall providing a cover wall of said main channel and extending beyond said main channel for guiding said well defined stream of fluid issued by said main channel at least while unmodulated and flowing in said first direction, said stream when unmodulated flowing in contact with said third wall, said two walls extending substantially perpendicularly of said third wall, and
a fourth wall extending parallel to said third wall and extending between said two walls,
said two walls, said third wall and said fourth wall defining an interaction chamber for said fluid stream with said control streams.

135. A fluid operated system exhibiting boundary layer effects, comprising means for issuing a deflectable stream of fluid into an interaction region, a sidewall disposed at a transverse location relative to the longitudinal centerline of the undeflected stream of fluid such that the stream of fluid may approach said sidewall and define a boundary layer region bounded on one side by said sidewall, a utilization port for the stream of fluid, a utilization device connected to said port and responsive to said stream of fluid and means for deflecting the stream of fluid so as to switch variable quantities of fluid toward and away from said utilization port, said means for deflecting the stream of fluid comprising control means for selectively varying the relative pressures of said boundary layer region and the remainder of the interaction region.

136. The combination according to claim 135 wherein said control means comprises at least one control aperture communicating with and permitting fluid flow into and out of the interaction region.

137. The combination according to claim 135 wherein said sidewall is a surface of revolution.

138. The combination according to claim 135 wherein said sidewall is disposed such that the stream of fluid may be deflected into contact with said sidewall.

139. The combination according to claim 135 wherein the utilization port is located downstream and remote from the region of contact between the stream of fluid and the sidewall.

140. The combination according to claim 135 wherein said means for issuing a stream of fluid comprises a power nozzle.

141. A method of controlling the fluid flow from a source to a point of utilization wherein the flow is used to perform work, the improvement comprising interposing a contoured body between the source and the point of utilization, directing the fluid flow from the source over the contoured body to effect a border layer along the surface of the body, and thereafter directing a further fluid flow against the border layer to break away the border layer from the body so as to change the direction of said fluid flow.

142. A method as claimed in claim 141, wherein said further fluid flow is directed through said body substantially perpendicular to the border layer.

143. A method as claimed in claim 141, wherein said further fluid flow is directed through said body substantially perpendicular to the border layer in proximity to the leading edge of the body.

144. A keyboard mechanism comprising: key means having exhaust means therein; a pressure regulated source of fluid; fluid amplifier means; and means connected to said source of fluid for exhausting fluid through said exhaust means when said exhaust means is open, and for applying fluid signals to said amplifier means when said exhaust means is blocked.

145. In a keyboard of the type wherein each key has a port for exhausting fluid, the improvement comprising: a fluid amplifier; a source of fluid; and means for conveying said fluid to said port, said means applying fluid signals to said amplifier when said port is blocked.

146. In combination: a keyboard having a plurality of ports in the surface thereof; a plurality of fluid amplifiers; a source of fluid; means for exhausting said fluid through said ports; and means connected to said amplifiers and said ports for applying fluid pressure signals to said amplifiers when said ports are blocked.

147. A mechanism for sensing the presence or absence of a material of a member, comprising an exhaust port, means for passing the member along a path intercepted by said exhaust port, a fluid amplifier providing a flow of fluid along a first path, a control means for issuing further fluid into said amplifier to cause the flow of fluid to follow a second path, a source of fluid and means connecting said source of fluid to said exhaust port and said control means.

148. A mechanism comprising exhaust means, fluid amplifier means, a source of fluid, and fluid conducting means connecting said source of fluid to said exhaust means and said amplifier means.

149. A keyboard mechanism comprising:
a fluid amplifier having a control signal input;

a fluid chamber connected to said control signal input;
a key having an opening in the face thereof;
fluid conducting means connected to said fluid chamber and terminating at the opening in said key; and
means for applying fluid under pressure to said fluid chamber, wherein said fluid amplifier is a bistable fluid amplifier having a further control signal input to which reset signals may be applied.

150. A control board mechanism comprising:
a fluid amplifier having a control signal input;
a fluid chamber connected to said control signal input;
a control device having an opening in the face thereof;
a fluid conducting means connected to said fluid chamber and terminating at the opening in said control device; and
means for applying fluid under pressure to said fluid chamber.

151. A control board mechanism as claimed in claim 150 wherein
said fluid conducting means comprises a passageway extending through said control device and a hollow tube connected to said passageway and said chamber.

152. A control board mechanism comprising:
control means having exhaust means therein;
a pressure regulated source of fluid; fluid amplifier means; and
means connected to said source of fluid for exhausting fluid through said exhaust means when said exhaust means is open, and for applying fluid signals to said amplifier means when said exhaust means is blocked.

153. In a control board of the type wherein each control device has a port for exhausting fluid, the improvement comprising
a fluid amplifier;
a source of fluid; and
means for conveying said fluid to said port,
said means applying fluid signals to said amplifier when said port is blocked.

154 In combination,
a control board having a plurality of ports in the surface thereof;
a plurality of fluid amplifiers;
a source of fluid;
means for exhausting said fluid through said ports; and
means connected to said amplifiers and said ports for applying fluid pressure signals to said amplifiers when said ports are blocked.

155. A control board device comprising
a unitary body having a plurality of chambers,
fluid passageways and fluid amplifiers therein,
each of said passageways terminating at one end at a port in the surface of said body and terminating at the other end at a port in one of said chambers,
said chambers being connected to said fluid amplifiers to apply control signals thereto; and
a second plurality of fluid passageways for applying fluid to said chambers.

156. A keyboard mechanism comprising:
a fluid amplifier having a control signal input;
a fluid chamber connected to said control signal input;
a key having an opening in the face thereof;
fluid conducting means connected to said fluid chamber and terminating at the opening in said key; and
means for applying fluid under pressure to said fluid chamber.

157. A fluid system comprising at least two fluid output apertures, an interaction region, means for issuing a stream of fluid through said interaction region toward said fluid output apertures, means for developing a variable pressure gradient across said stream of fluid so as to direct at least a predetermined quantity of fluid to one of said fluid output apertures selectively, a member movable between first and second positions, means for coupling said member to said one of said fluid output apertures so as to move said member from said first position to said second position upon said predetermined quantity of fluid being directed to said one of said output apertures, a recording medium, means for marking said recording medium upon movement of said member from said first to said second position and means for returning said member from said second to said first position upon termination of flow of said predetermined quantity of fluid to said one of said output apertures.

158. A fluid operated system comprising a nozzle for issuing a deflectable stream of fluid into an interaction region, at least two fluid receiving regions located downstream of said interaction region each in a position to intercept said stream of fluid, a sidewall for said interaction region, and a control means for controlling fluid flow relative to said interaction region thereby to develop a variable pressure gradient across said stream and deflect said stream toward and away from said sidewall so as to vary the relative quantities of fluid supplied to said receiving regions, said sidewall being located such that upon deflection of said stream by said control means a boundary layer is established between said stream and said sidewall further deflecting said stream as a function of deflection produced by said control means a utilization means, and means connecting said utilization means to be responsive to said relative quantities of fluid supplied to said receiving regions, respectively.

159. A fluid oscillator comprising a fluid amplifier having a power nozzle, a pair of opposing control nozzles and at least a pair of output passages for receiving fluid issued by said power nozzle, differentially; an oscillatory body; means for supplying fluid to said body from one of said output passages to move said body from a first to a second position; means for returning said body to its first position upon termination of flow to said one output passage; and means responsive to the position of said body to direct flow first to one and then to another of said control nozzles to direct said stream to one and then the other of said output passages.

160. A record position sensing mechanism comprising a support adapted to support and guide said record while traveling thereon, said support including at least one aperture, said aperture being disposed in the path of travel of said record, a fluid amplifier having an input channel, first and second output channels, a source of power fluid connected to said input channel normally directing a power stream through said first output channel, means connected between said aperture and said fluid amplifier responsive to said record covering said aperture to switch said power stream from said first to said second output channel.

161. A record position sensing mechanism, comprising in combination: means including a flat surface for supporting and guiding said record, said flat surface having an aperture disposed in the path of travel of said record, a fluid amplifier having an input channel, first and second output channels, a first source of fluid connected to said input channel normally directing a power stream through said first output channel, a control channel connected to said fluid amplifier adjacent said first output channel, a second source of fluid, conduit means communicating with said control channel and connected between said aperture and said second source of fluid providing a fluid signal in said control channel to switch said power stream from said first to said second output channels when said record covers said aperture.

162. The combination comprising: a boundary layer fluid amplifier having a first signal input channel through which fluid signals may be applied to selectively switch its power stream between a first and a second state; a further amplifier having a control signal input channel connected to said boundary layer amplifier whereby a power stream flowing in said further amplifier is deflected from a first direction of flow to a second direction of flow by the power stream of said boundary layer amplifier when in one of its states; output means connected to said further amplifier; means for continuously applying a fluid power stream to said boundary layer amplifier; means for selectively applying signals to said first input channel; and means for repetitively applying a power stream to said further amplifier whereby said output means is repetitively actuated if a data signal is applied to said first signal input channel.

163. A record medium sensing mechanism comprising a support adapted to support and guide said record medium while traveling thereon, said support including at least one aperture, said aperture being disposed in the path of travel of said record medium, a fluid amplifier having an input channel, first and second output channels, a source of power fluid connected to said input channel normally directing a power stream through said first output channel, means connected between said aperture and said fluid amplifier responsive to said record medium covering said aperture to switch said power stream from said first to said second output channel.

164. A record medium sensing mechanism, comprising in combination: means including a surface for supporting and guiding said record medium, said surface having an aperture disposed in the path of travel of said record medium, a fluid amplifier having an input channel, first and second output channels, a first source of fluid connected to said input channel normally directing a power stream through said first output channel, a control channel connected to said fluid amplifier adjacent said first output channel, a second source of fluid, conduit means communicating with said control channel and connected between said aperture and said second source of fluid providing a fluid signal in said control channel to switch said power stream from said first to said second output channels when said record medium covers said aperture.

165. A fluidic device, including a channel for issuing a well defined stream of said fluid in a first direction, said stream of fluid being deflectable in alternate senses with respect to the center line of the undeflected stream, separate control channels for applying separate fluid control streams to opposite sides of said well defined stream of said fluid, respectively, to deflect said well defined stream of said fluid in said alternate senses, two walls located on opposite sides of said well defined stream, said two walls being so located and shaped that stream interaction of said stream with said walls occurs selectively according to the sense in which said stream is deflected, said control channels extending through said two walls, at least two discrete ports located on opposite sides of said center line for issuance of said stream when deflected in said alternate senses, at least one third wall providing a cover wall of said channel and extending beyond said channel for guiding said well defined stream of fluid issued by said channel at least while undeflected and flowing in said first direction, said stream when undeflected flowing in contact with said third wall, said two walls extending substantially perpendicularly of said third wall, and a fourth wall extending parallel to said third wall, said two walls, said third wall and said fourth wall defining an interaction chamber for said fluid stream with said control streams.

166. A selectively operable control board input device comprising:

a control board having therein a bistable pure fluid amplifier having first and second output channels intersecting to form a chamber, and a power stream input channel terminating at an orifice in said chamber, said output channels and said orifice being positioned such that the walls of said chamber formed by a first wall of each of said output channels are offset from said orifice to thereby produce regions of low pressure between said walls and a power stream entering said chamber through said orifice, said chamber having a dividing element formed by the intersection of second walls of said output channels at a point close enough to said orifice to avoid enhancement of said low pressure regions, means for applying a fluid stream to said power stream input channel, said first wall of said second channel being offset from said orifice a greater distance than said first wall of said first channel so that upon the initiation of fluid flow through said orifice said power stream flows into said first output channel, control device operated means for selectively blocking said first output channel whereby said power stream is switched to thereby flow into said second output channel, said second output channel but not said first output channel having an acute change of slope, said slope creating a vortex tending to enhance the low pressure region adjacent the first wall of said second output channel when the power stream flows therethrough, and means for switching said power stream to flow into said first output channel.

References Cited

UNITED STATES PATENTS

| | | | |
|---|---|---|---|
| 2,727,525 | 12/1955 | Harris | 137—81.5 |
| 2,985,181 | 5/1961 | Nixon | 137—81.5 X |

JAMES M. MEISTER, *Primary Examiner.*

PO-1050
(5/69)

UNITED STATES PATENT OFFICE
CERTIFICATE OF CORRECTION

Patent No. 3,396,619 Dated August 13, 1968

Inventor(s) Romald E. Bowles and Raymond W. Warren

It is certified that error appears in the above-identified patent and that said Letters Patent are hereby corrected as shown below:

In Column 29, line 20, "claim 48" is corrected to read --claim 49--.

SIGNED AND SEALED

AUG 26 1969

(SEAL)
Attest:

[illegible] [illegible]tcher, Jr.
Atte[illegible] [illegible]icer

WILLI[illegible] E. [illegible], JR.
Commissioner of Patents

US003396619A
REEXAMINATION CERTIFICATE (1738th)
United States Patent [19]
[11] B1 3,396,619

Bowles et al.

[45] Certificate Issued Jul. 14, 1992

[54] FLUID AMPLIFIER EMPLOYING BOUNDARY LAYER EFFECT

[75] Inventors: Ronald E. Bowles, 12712 Meadowood Dr., Silver Spring, Md. 20904; Raymond W. Warren, 7925 Falstaff Rd., McLean, Va. 22101

[73] Assignees: Ronald E. Bowles; Raymond W. Warren, Silver Spring, Md.

Reexamination Request:
No. 90/001,802, Jun. 27, 1989

Reexamination Certificate for:

| | |
|---|---|
| Patent No.: | **3,396,619** |
| Issued: | **Aug. 13, 1968** |
| Appl. No.: | **58,188** |
| Filed: | **Oct. 19, 1960** |

Certificate of Correction issued Aug. 26, 1969.

Related U.S. Application Data

[63] Continuation-in-part of Ser. No. 255,478, Nov. 25, 1959, and Ser. No. 4,830, Jan. 26, 1960.

[51] Int. Cl.[5] .......... F15C 1/12
[52] U.S. Cl. .......... 137/1; 137/803; 137/810; 137/811; 137/819; 137/841
[58] Field of Search .......... 137/842, 835, 803, 810, 137/811, 841, 1, 14, 15; 239/265.17

[56] References Cited

U.S. PATENT DOCUMENTS

| | | | |
|---|---|---|---|
| 325,459 | 9/1885 | Taylor | 137/823 |
| 1,329,559 | 2/1920 | Tesla | 137/842 |
| 1,984,707 | 12/1934 | Sommer | 181/275 |
| 2,052,869 | 9/1936 | Coanda | 137/83 |
| 2,111,741 | 5/1935 | Buckland | 352/221 |
| 2,167,303 | 7/1939 | Kadenacy | 60/324 |
| 2,247,301 | 6/1941 | Lesser | 137/83 |
| 2,262,940 | 11/1941 | Samu-El-Ish-Shalom | 366/101 |
| 2,397,448 | 3/1946 | Todd | 137/83 |
| 2,408,603 | 10/1946 | Braithwaite | 137/802 |
| 2,408,705 | 10/1946 | Todd | 137/802 |
| 2,692,800 | 10/1954 | Nichols et al. | 137/14 |
| 2,702,986 | 3/1955 | Kadosch | 239/265.19 |
| 2,725,040 | 11/1955 | Harris | 137/83 |
| 2,727,525 | 12/1955 | Harris | 137/83 |
| 2,727,535 | 12/1955 | Linderoth | 137/803 |
| 2,755,767 | 7/1956 | Levavasseur | 116/137 A |
| 2,770,501 | 11/1956 | Coanda | 239/429 |
| 2,793,493 | 5/1957 | Kadosch | 239/265.17 |
| 2,812,636 | 11/1957 | Kadosch | 415/914 |
| 2,812,980 | 11/1957 | Kadosch | 60/230 |
| 2,825,204 | 3/1958 | Kadosch | 60/263 |
| 2,875,578 | 3/1959 | Kadosch | 239/265.17 |
| 2,889,856 | 6/1959 | Magnvson | 137/823 |
| 2,907,337 | 10/1959 | Bemporad | 137/83 |
| 2,916,873 | 12/1959 | Walker | 137/803 |
| 2,943,821 | 7/1960 | Wetherbee, Jr. | 244/52 |
| 2,948,148 | 8/1960 | De La Salle D'Anfreville | 60/231 |
| 3,004,547 | 10/1961 | Hurvitz | 137/83 |
| 3,005,533 | 10/1961 | Wadey | 239/265.23 |
| 3,016,066 | 12/1962 | Warren | 137/835 |
| 3,024,805 | 5/1962 | Horton | 137/835 |
| 3,034,628 | 5/1962 | Wadey | 137/832 |
| 3,036,430 | 5/1962 | Eggers et al. | 239/265.23 |
| 3,071,145 | 12/1962 | Blanchard | 366/124 |
| 3,111,931 | 11/1963 | Bodine | 137/835 |

FOREIGN PATENT DOCUMENTS

| | | |
|---|---|---|
| 154674 | 1/1954 | Australia . |
| 493723 | 6/1953 | Canada . |
| 573961 | 4/1959 | Canada . |
| 563579 | 11/1932 | Fed. Rep. of Germany . |
| 567913 | of 1933 | Fed. Rep. of Germany . |
| 676304 | 6/1939 | Fed. Rep. of Germany . |
| 677803 | 7/1939 | Fed. Rep. of Germany . |
| 217365 | 11/1906 | Fed. Rep. of Germany . |
| 933896 | 10/1955 | Fed. Rep. of Germany . |
| 971025 | 11/1958 | Fed. Rep. of Germany . |
| 973315 | 1/1960 | Fed. Rep. of Germany . |
| 1030483 | 6/1953 | France . |
| 1039511 | 10/1953 | France . |
| 1109415 | 1/1956 | France . |
| 1131551 | 2/1957 | France . |
| 1206616 | 2/1960 | France . |
| 660258 | 7/1936 | German Democratic Rep. . |
| 5497 | 6/1953 | German Democratic Rep. . |
| 242314 | 11/1925 | United Kingdom . |

OTHER PUBLICATIONS

Dietechnick, vol. 9, Issue 6, Jun. 1954, Ferner, pp. 359–365.

Electronic Measuring Instruments, 1958, Banner, pp. 70–72.

Pulse & Digital Circuits, 1956, Millman et al., pp. 4–9.

*Primary Examiner*—A. Michael Chambers
*Attorney, Agent, or Firm*—Larson and Taylor

EXEMPLARY CLAIM

1. A pure fluid system, comprising:
   a walled chamber,
   a nozzle for issuing a jet of fluid into said chamber along a wall of said chamber,
   a receiving channel upstream of said wall and positioned to receive said jet,
   said receiving channel having channel walls containing a sufficiently abrupt change of slope to form a vortex in response to said jet during closure of said channel operative to prevent transfer of said jet out of said channel in response to closure of said channel.

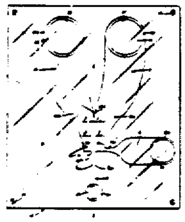

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-140 and 144-166 is confirmed.

Claims 141-143 are cancelled.

* * * * *